United States Patent
DeGroot et al.

(10) Patent No.: US 9,359,141 B2
(45) Date of Patent: Jun. 7, 2016

(54) POSITIVELY-DRIVEN, LOW TENSION TRANSFER CONVEYOR

(71) Applicant: Laitram, L.L.C., Harahan, LA (US)

(72) Inventors: Michael Hendrik DeGroot, Rockford, MI (US); Daniel Robert Hendrickson, Cedar Springs, MI (US); James R. Honeycutt, Jr., Grandville, MI (US); Brian A. Trapani, Kenner, LA (US); Wayne A. Pertuit, Jr., Westwego, LA (US); Paul E. St. Pierre, Harahan, LA (US); Philipp J. Hortig, Rockford, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/984,427

(22) Filed: Dec. 30, 2015

(65) Prior Publication Data
US 2016/0107840 A1   Apr. 21, 2016

Related U.S. Application Data

(63) Continuation-in-part of application No. 14/061,968, filed on Oct. 24, 2013, now Pat. No. 9,242,801.

(60) Provisional application No. 61/718,941, filed on Oct. 26, 2012.

(51) Int. Cl.
| | |
|---|---|
| *B65G 23/44* | (2006.01) |
| *B65G 15/60* | (2006.01) |
| *B65G 23/06* | (2006.01) |
| *B65G 23/26* | (2006.01) |

(52) U.S. Cl.
CPC ............... *B65G 15/60* (2013.01); *B65G 23/06* (2013.01); *B65G 23/26* (2013.01); *B65G 23/44* (2013.01)

(58) Field of Classification Search
CPC ..................... B65G 23/44; B65G 2812/02148
See application file for complete search history.

(56) References Cited

U.S. PATENT DOCUMENTS

| | | | | | |
|---|---|---|---|---|---|
| 2,576,217 | A | * | 11/1951 | Eggleston | B65G 21/14 198/313 |
| 3,620,346 | A | * | 11/1971 | Brooke | B65G 15/60 198/335 |
| 3,734,007 | A | | 5/1973 | Husen | |
| 4,171,044 | A | * | 10/1979 | Rossio | B65G 23/34 198/834 |
| 5,074,402 | A | | 12/1991 | Bender-Zanoni et al. | |

(Continued)

FOREIGN PATENT DOCUMENTS

| | | | | |
|---|---|---|---|---|
| CH | WO 2013/110312 | * | 1/1992 | ............. B65G 43/02 |
| EP | 0583849 A1 | | 2/1994 | |

(Continued)

OTHER PUBLICATIONS

International Search Report and Written Opinion of the International Searching Authority, PCT/US2013/066506, mailed Jan. 2, 2014, European Patent Office, Rijswikj, NL.

*Primary Examiner* — Thomas Randazzo
(74) *Attorney, Agent, or Firm* — Catherine M. Bishop

(57) ABSTRACT

Components of a conveyor system designed to facilitate tight transfer of products onto and off a positively-driven, low tension conveyor belt. The conveyor system includes a tension amplifier in a returnway of a conveyor belt circuit for selectively increasing tension in the conveyor belt prior to infeed without increasing the low tension in the returnway prior to the tension amplifier.

15 Claims, 25 Drawing Sheets

(56) References Cited

U.S. PATENT DOCUMENTS

| | | | |
|---|---|---|---|
| 5,361,893 A * | 11/1994 | Lapeyre | B65G 17/08 198/690.2 |
| 5,410,951 A | 5/1995 | Ledet et al. | |
| 5,715,879 A | 2/1998 | Jones | |
| 5,911,307 A | 6/1999 | Kraft et al. | |
| 6,196,381 B1 | 3/2001 | Kato et al. | |
| 6,367,619 B1 | 4/2002 | Cemke, Jr. et al. | |
| 6,638,553 B2 * | 10/2003 | Bell | A21B 1/48 198/602 |
| 7,134,544 B1 | 11/2006 | Kilper et al. | |
| 7,308,979 B1 | 12/2007 | Layne et al. | |
| 7,849,999 B1 | 12/2010 | Cooley et al. | |
| 8,163,214 B2 | 4/2012 | Mol | |
| 2002/0179414 A1 * | 12/2002 | Wullschleger | B65G 23/44 198/810.01 |
| 2003/0075417 A1 * | 4/2003 | Becker | B65G 43/00 198/832 |
| 2004/0163926 A1 | 8/2004 | Preuninger et al. | |
| 2005/0143209 A1 | 6/2005 | Shibutani | |
| 2007/0179002 A1 * | 8/2007 | DeGroot | B65G 15/42 474/205 |
| 2007/0297883 A1 | 12/2007 | Ash | |
| 2008/0146391 A1 * | 6/2008 | DeGroot | B65G 15/26 474/153 |
| 2011/0108395 A1 * | 5/2011 | Hata | B65G 15/08 198/835 |
| 2013/0221761 A1 * | 8/2013 | DePaso | B65G 17/08 307/151 |

FOREIGN PATENT DOCUMENTS

| | | | |
|---|---|---|---|
| EP | 1418139 A1 | 12/2004 | |
| JP | H05294429 A | 11/1993 | |
| NL | EP 0583849 | * 8/1992 | ............ B65G 23/00 |
| NL | 1021762 C2 | 6/2003 | |
| WO | 2007085446 A1 | 8/2007 | |
| WO | 2013110312 A1 | 8/2013 | |

* cited by examiner

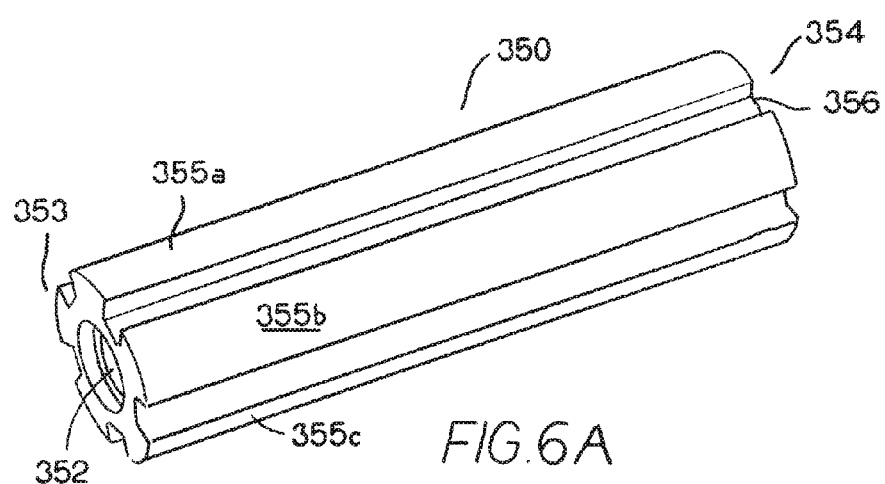
FIG. 6A
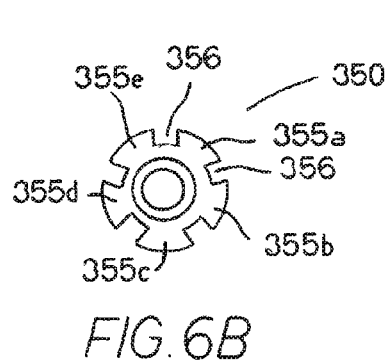
FIG. 6B
FIG. 6C

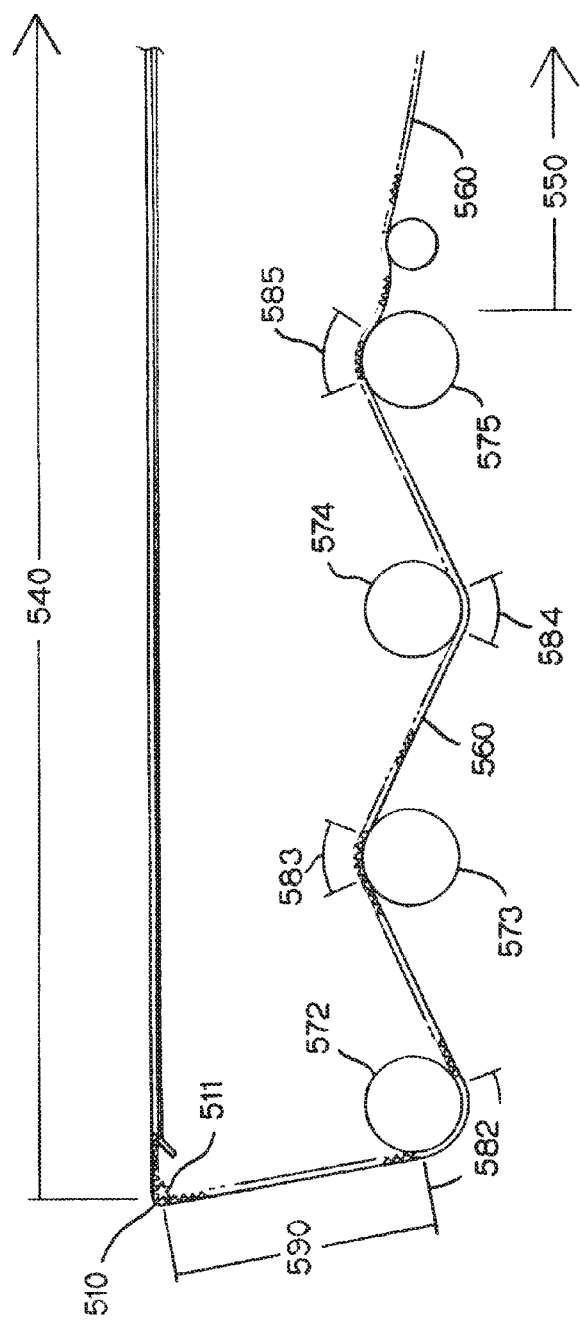

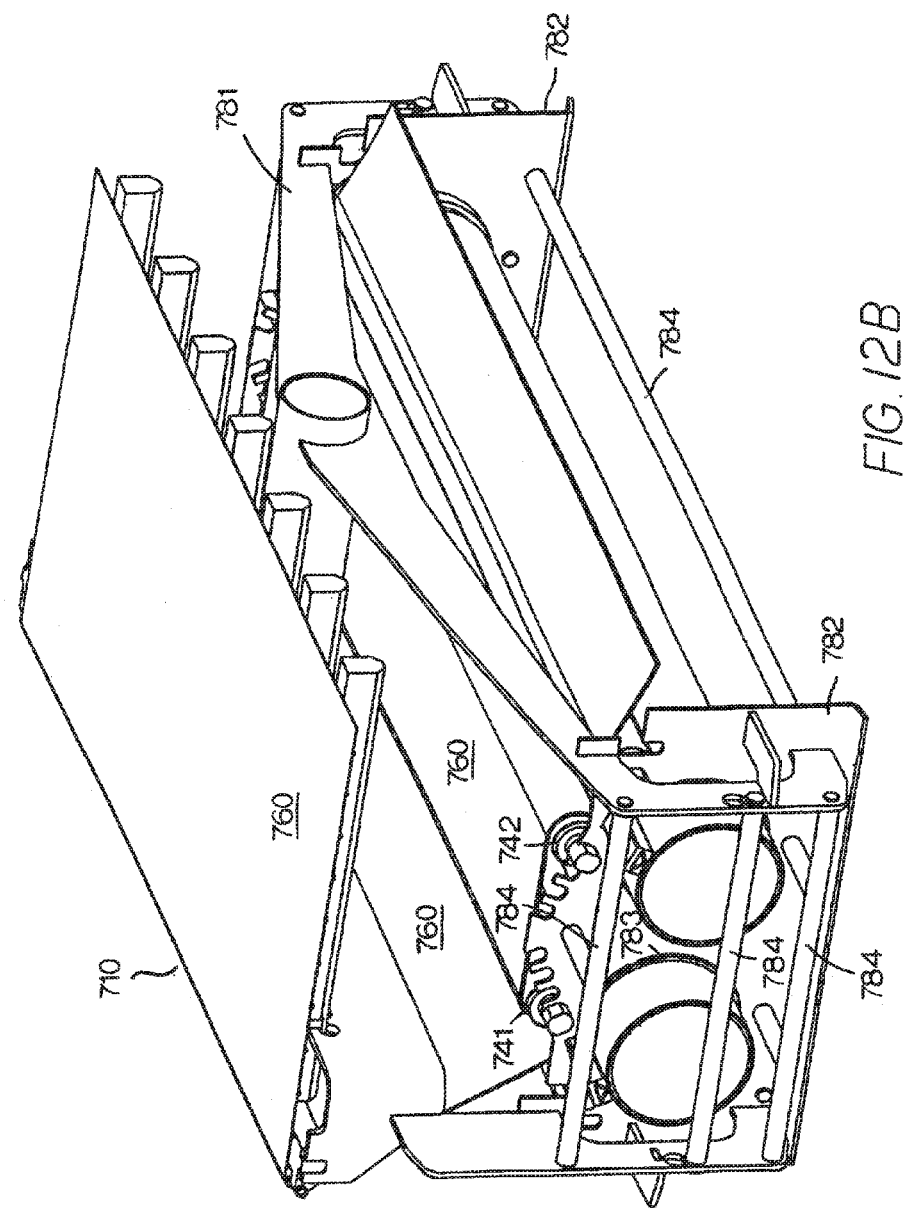

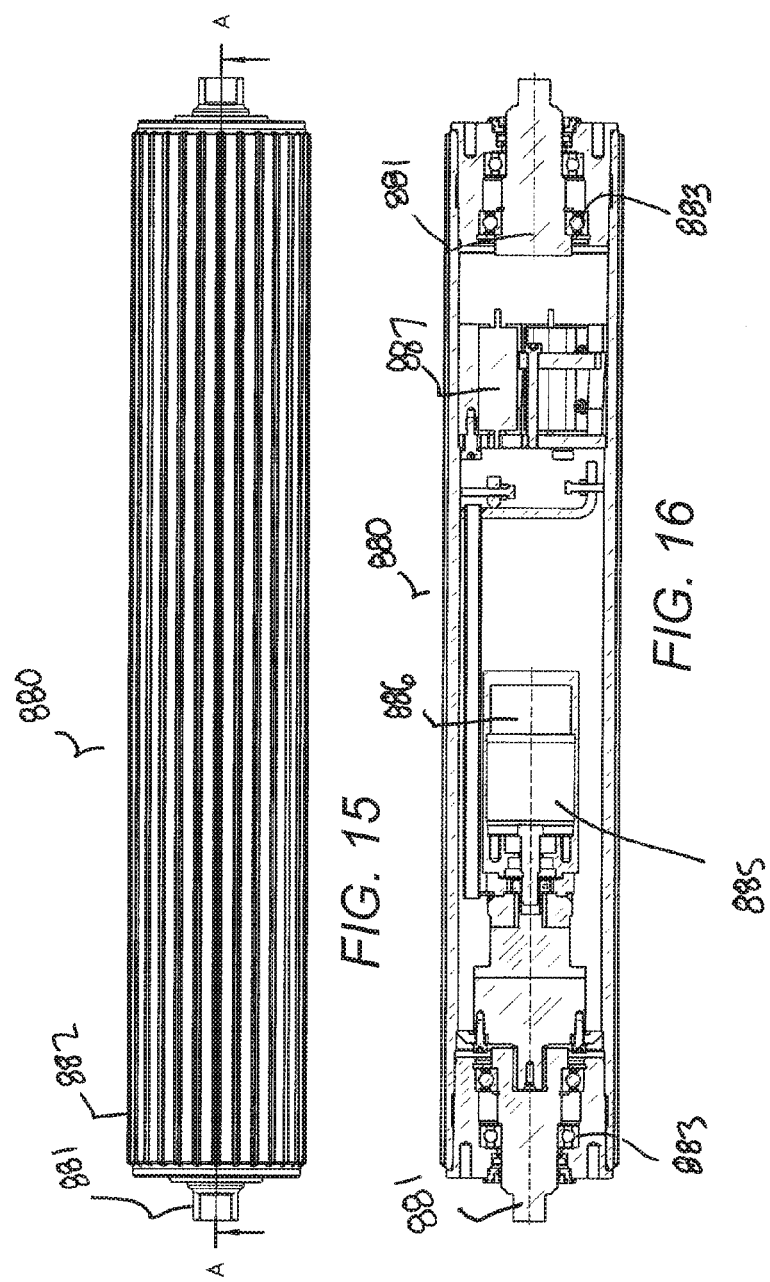

POSITIVELY-DRIVEN, LOW TENSION TRANSFER CONVEYOR

RELATED APPLICATIONS

The present application is a continuation-in-part of U.S. patent application Ser. No. 14/061,968 entitled "Positively-Driven, Low Tension Transfer Conveyor", filed Oct. 24, 2013, which is incorporated herein by reference and which claims priority to U.S. Provisional Patent Application No. 61/718,941, filed Oct. 26, 2012, also entitled "Positively-Driven, Low Tension Transfer Conveyor" and also incorporated herein by reference.

FIELD OF THE INVENTION

The present invention relates generally to power-driven conveyor belts, and more particularly to positively-driven, low tension conveyor belts that are driven as teeth engage sprockets or sprocket-like drive pulleys.

BACKGROUND OF THE INVENTION

Flat conveyor belting is traditionally configured to move through a circuit in a conveyor. The circuit includes a drive pulley, a carryway tension zone, a returnway tension zone, an infeed and an outfeed. In many instances, the outfeed of the conveyor system also serves as the drive pulley. In traditional configurations, the flat conveyor belt is driven through the circuit by means of friction between the bottom surface of the belt and the drive pulley. In order to create sufficient friction to drive the belt along the circuit, the belt must be pre-tensioned.

FIG. 1 illustrates a conveyor 10 running a traditional, pretensioned, flat, friction-driven conveyor belt 60 suitable for transferring products to and from the conveyor. The conveyor includes a drive pulley 30 below the conveyor 10, thereby enabling small diameter rollers in the infeed 21 and the outfeed 22. Small diameter rollers in the infeed 21 and outfeed 22 are desired when, for example, small product is desired to transfer smoothly between conveyors.

As the flat, pretensioned, friction-driven, conveyor belt 60 moves in the direction of arrow 62 from the infeed 21 to the drive pulley 30, it runs along a carryway tension zone 40, as distinguished from a returnway tension zone 50, which extends from the drive pulley 30 to the infeed 21.

The difference between the tension on the conveyor belt 60 at the beginning of the returnway tension zone 50 and the tension on the belt 60 at the end of the carryway tension zone 40 is referred to as the "tension differential," and their ratio is referred to as the "tension ratio." The maximum tension differential and the maximum tension ratio depend upon the interplay between the coefficient of friction between the drive pulley 30 and bottom surface of the conveyor belt 60 and the belt arc of wrap in radians around the drive pulley 30. The maximum tension ratio can be calculated as follows:

$$\frac{T_{CT}}{T_{RT}} = e^{(COF \times AW)}$$

where T represents belt tension, $T_{CT}$ represents the belt tension at the end of the carryway tension zone 40, $T_{RT}$ represents the belt tension at the beginning of the returnway tension zone 50, COF represents the coefficient of friction between the bottom surface of the belt 60 and the periphery of the drive pulley 30, and AW represents the arc wrap of the belt in radians.

In order for the conveyor belt 60 to drive through the circuit of the conveyor 10 of FIG. 1 with no product load, the conveyor belt 60 must be pretensioned. This pretension is referred to as static tension, as opposed to dynamic tension. Pretension is the tension in the conveyor belt 60 that is applied prior to the operation of the conveyor belt. This static tension can be generated in different ways, but most frequently it is generated by extending the effective circuit length beyond the natural length of the conveyor belt 60. The static pretension is present in the conveyor belt prior to operation, when the belt is stationary, and also during operation. Even when product load is added, the predominant tension in the belt 60 is pretension. Therefore, the conveyor belt 60 has significant tension in the returnway tension zone 50.

When product is conveyed along the carryway tension zone 40 of the conveyor 10, the load is increased and, with it, the tension on the belt in the carryway tension zone. As the belt returns through the returnway tension zone 50 of the conveyor, the tension on the belt is reduced.

The maximum tension differential determines the amount of pretension that is required to effectively drive a flat conveyor belt for a given maximum amount of product load. When a flat conveyor belt is being driven without any product load, the actual tension differential will be at the lowest point. The tension on the belt in the returnway tension zone will be similar to the tension on the belt in the carryway tension zone. However, when product load is added, the actual tension differential will increase. The higher the product load, the greater the actual tension differential will become. Therefore, since the maximum tension differential for a flat conveyor belt is limited by the practical limits of arc of wrap and the coefficient of friction, pretension accounts for a significant portion of the tension in the belt at any given time, and in fact is often the majority of the tension in the belt. The result is that when traditional flat conveyor belt is friction driven, the belt experiences high amounts of tension throughout the length of the belt at all times.

An advantage of this inherently needed pretension is that, dependent upon the flexibility of the material construction of the belt, the friction-driven belt can readily conform to various transition geometries at the infeed and outfeed of the conveyor.

However, there are two significant disadvantages to the inherently needed pretension of a friction-driven, flat conveyor belt. The first disadvantage of using the high belt tensions is that misalignment of any component in the conveyor causes large forces to off-track the belt, causing damage to both the conveyor and the belt.

A second disadvantage is that the flat conveyor belt 60 tends to stretch as pretension is applied. In order to limit the amount of stretch in the conveyor belt while maintaining flexibility, fabrics and cords are added to restrict the stretch and enable the belt to operate under high tensions. However these fabrics and cords are a serious harborage point of bacteria and possible pathogens in food processing applications. The common off-tracking of the belt further causes edge fray promoting the exposed fabrics to wick foreign contaminates into the belt where bacteria colonies can grow.

In recent years, a new style of conveyor belting has emerged to counter these and other disadvantages of traditional flat conveyor belts. For example, a positively-driven, low-tension conveyor belt, such as the ThermoDrive® belt available from Intralox, L.L.C., is driven through positive engagement of teeth on the bottom surface of the belt with a sprocket or sprocket-like pulley, instead of pure friction. A positively-driven conveyor belt has a dramatically higher maximum tension differential between the carryway tension zone and the returnway tension zone and therefore the level of pretension is dramatically reduced. U.S. Pat. No. 7,850,562, entitled "Low Friction, Direct Drive Conveyor Belt," the contents of which are incorporated herein by reference, discloses a method under which such a belt can be driven with no pretension requirements at all. When utilizing the technology described in U.S. Pat. No. 7,850,562, the tension ratio is theoretically infinite. Yet even without this technology, the maximum tension differential is significantly higher for positively-driven, low-tension, toothed conveyor belts than for traditional, friction-driven, flat, conveyor belting and thus the level of pretension required is low for positively-driven conveyor belts.

There are two significant advantages of reducing pretension in a positively-driven conveyor belt. First, the tracking problems associated with misalignment in the conveyor are reduced or even removed. Further, because the pretension is so low, many belts are constructed with no fabric reinforcements at all, which improves food safety and hygiene in food processing applications.

An example of a flexible, endless, positively-driven, low tension conveyor belt suitable for implementing an illustrative embodiment of the invention is shown in FIG. 2. An endless conveyor belt 160 in a typical installation moves around two cylindrical belt-guiding members, illustrated, as sprockets 112 and 114, through a circuit. A first sprocket 114 may be a drive sprocket for driving the conveyor belt, while the second sprocket may be an idle, a driven or slave sprocket 112. The drive sprocket 114 also functions as transition geometry in the outfeed of the conveyor. The belt 160 has an outer surface 111 serving as an article-conveying surface and an inner surface 122 serving as a drive surface. The inner surface 122 includes drive elements, illustrated as teeth 126, preferably spaced equidistantly from each other along the inner driven surface 122. The teeth 126 engage grooves 116 spaced around the circumference of the sprockets 112, 114 to move the belt. The upper span (carryway) 140 of the belt will travel in the direction of arrow 115. The flexible belt 160 wraps around the sprocket 114 and around one or more return rollers, or shoes or drums, in the return path (returnway). The conveyor belt 160 operates at low tension, resulting in substantial catenary sag (not shown) in the returnway tension zone 150. The sprocket in the infeed 112 is of a larger diameter so that the positively-driven, toothed, low-tension, conveyor belt 160 can properly conform to the sprocket in the infeed end of the conveyor.

The belt is made of a resilient material, such as a thermoplastic polymer, an elastomer, or a rubber, and is flexible along its length.

To transfer products between two endless conveyor belts, the belts must be placed close together to minimize the gap between the conveyor belts at the transfer point. Small nosebars, shoes or other structure are usually used at the transfer locations to allow the ends of the belts to be placed in close proximity to each other.

A disadvantage of positively-driven, toothed, low tension, conveyor belting is that without sufficient tension in the belt it does not readily conform around transition points at the infeed that are smaller than the arc of natural curvature in the belt as it transitions around the infeed. Small transfers in ThermoDrive® and other low-tension, positive drive endless conveyor belts are often difficult, because the lack of tension prevents the belt from conforming to a small nosebar or other infeed structure.

FIG. 3A is a simplified schematic cross-sectional representation of a conveyor 200 running a positively-driven, toothed, low-tension, conveyor belt 260, through a conveyor circuit in which small diameter cylindrical members are used at the infeed and outfeed. The conveyor circuit includes a carryway 240 and a returnway 250. Smaller diameter sprockets 211, 231 are used in the infeed 210 and outfeed 230 to facilitate transfer of products onto and off the conveyor belt 260. However, problems arise when the sprocket 211 at the infeed 210 is smaller in diameter than the arc of the natural curvature of the belt 260 as it transitions around the infeed 210, as shown in FIGS. 3A and 3B. The result of this smaller diameter sprocket in the infeed 210 is that the conveyor belt 260 protrudes beyond the plane of the belt circuit creating a ridge 262 along the width of the conveyor belt 260 at the infeed 210, which makes transfer of product onto the belt difficult.

To resolve these drawbacks, users of positively-driven, toothed, conveyor belting have resorted to adding more pretension than is required to drive the belt, in order to achieve the desired conformation around the infeed roller, thus minimizing the tracking benefits and non-fabric-reinforced sanitary benefits that could otherwise be achieved in a non-pretensioned belt.

The amount of pretension required to maintain belt conformity to specific transition geometries at the infeed is greater than the amount of pretension required to achieve belt conformity at the infeed when the belt is installed. This is because when product load is added and the tension differential increases, the added tension on the belt in the carryway tension zone results in some amount of conveyor belt elongation. This additional belt length is generally found in the returnway tension zone, resulting in a tension in the belt as it encounters the infeed that is lower than the pretension initially applied. To maintain belt conformity around small transition geometries at the infeed by means of pretension, the toothed, positively driven conveyor belt will often be pretensioned beyond the pretension level required to drive the conveyor belt.

SUMMARY OF THE INVENTION

The present invention provides a positively-driven, low tension conveyor system that facilitates transferring articles onto and off the conveyor belt at the ends of the conveyor. The conveyor system includes a tension amplifier to dynamically increase tension along a select portion of the belt and may include a small infeed member, such as a rotatable, toothed nosebar. The selective increased tension along only a portion of the belt, preferably only while the belt is running, allows the belt to conform to the nosebar or other small infeed member of any geometry, facilitating transfers.

According to one aspect, a conveyor system comprises a positively-driven, low tension conveyor belt trained around belt-guiding members to form a circuit having a carryway, an infeed, an outfeed and a returnway. The conveyor system further includes a drive for positively driving the conveyor belt through the circuit and a tension amplifier located in the returnway for increasing tension in a first section of the circuit between the tension amplifier and the carryway, while the returnway of the conveyor belt between the tension amplifier and the drive remains substantially untensioned.

According to another aspect, a conveyor system comprises a positively-driven, low tension conveyor belt trained around an infeed belt-guiding member and an outfeed belt-guiding member to form a circuit having an infeed, a carryway, an outfeed and a returnway below the carryway, a drive for positively driving the conveyor belt and a tension amplifier disposed in the returnway for dynamically increasing tension in a first section of the circuit, while a second section of the circuit remains substantially untensioned.

According to another aspect, a method of conforming a positively-driven, low tension conveyor belt to an infeed member that is smaller than a natural arc of the conveyor belt comprises the steps of running the conveyor belt through a circuit comprising a carryway having an infeed and an outfeed, and a returnway below the carryway using a drive that positively drives the conveyor belt, increasing tension in the conveyor belt along a first section of the circuit using a tension amplifier in the returnway without increasing tension along the returnway of the circuit between the tension amplifier and the drive and releasing the tension added by the tension amplifier at the drive, so that a second section of the circuit between the drive and the tension amplifier remains substantially untensioned.

BRIEF DESCRIPTION OF THE FIGURES

These features of the invention, as well as its advantages, are better understood by referring the following description, appended claims, and accompanying drawings, in which:

FIG. 6A is an isometric view of nosebar of the conveyor belt system of FIGS. 4 and 5;

FIG. 6B is an end view of the nosebar of FIG. 6A;

FIG. 6C is a cross-sectional of the nosebar of FIG. 6A;

FIG. 9B is an enlarged view of the tension amplifier of FIG. 9A;

FIG. 12B is an isometric view of the infeed portion of FIG. 12A;

FIG. 15 is a front view of the roller assembly of FIG. 14;

FIG. 16 is a cross-sectional view of the roller assembly through lines A-A of FIG. 15;

DETAILED DESCRIPTION OF THE INVENTION

The present invention provides a system for facilitating transfer of products to and from positively-driven, low tension endless conveyor belts by dynamically increasing tension in a portion of the belt. The present invention provides a tension amplifier and method for dynamically amplifying tension at a select and limited region of a positively-driven, low tension conveyor belt prior to the infeed of the conveyor to enable the conveyor belt to conform to an infeed member, such as a nosebar, roller, sprocket or shoe of any geometry, that is smaller than the natural curvature of the belt. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
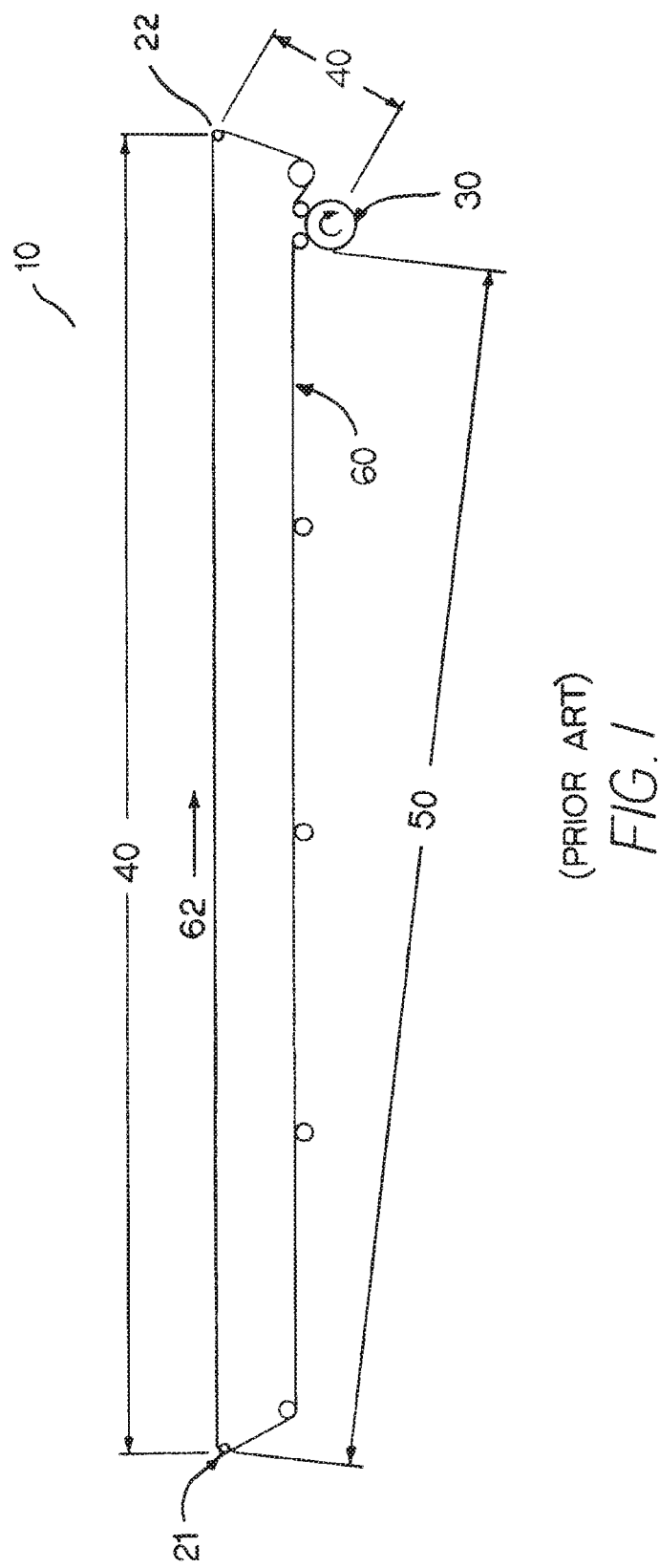
FIG. 1 illustrates an endless flat conveyor belt of the prior art.
Figure 2:
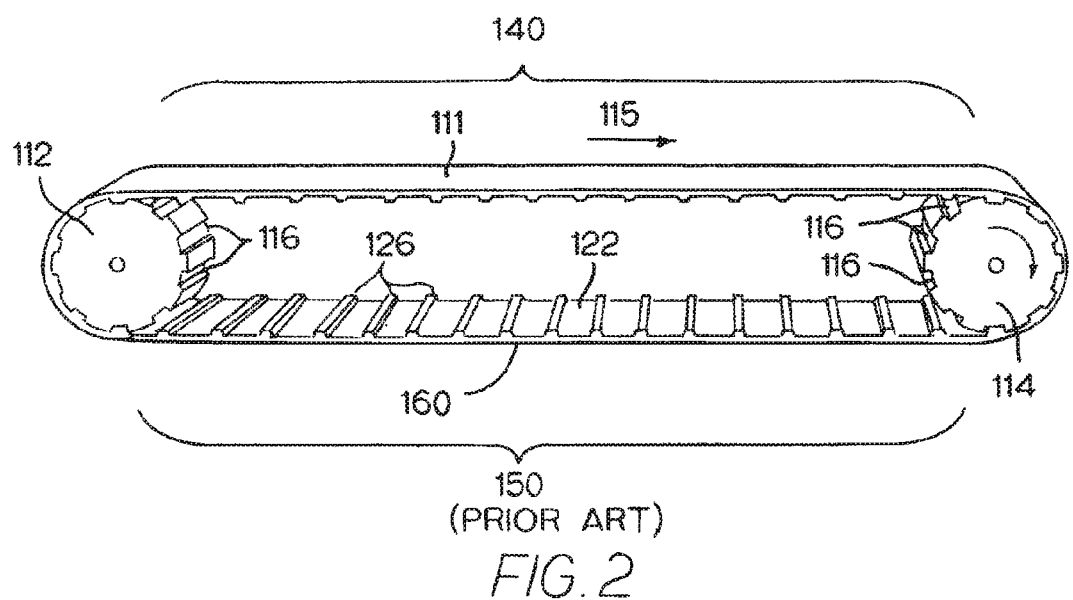
FIG. 2 is a simplified schematic cross-sectional representation of a conveyor running a positively-driven, toothed, low-tension, conveyor belt of the prior art.
Figure 3A:
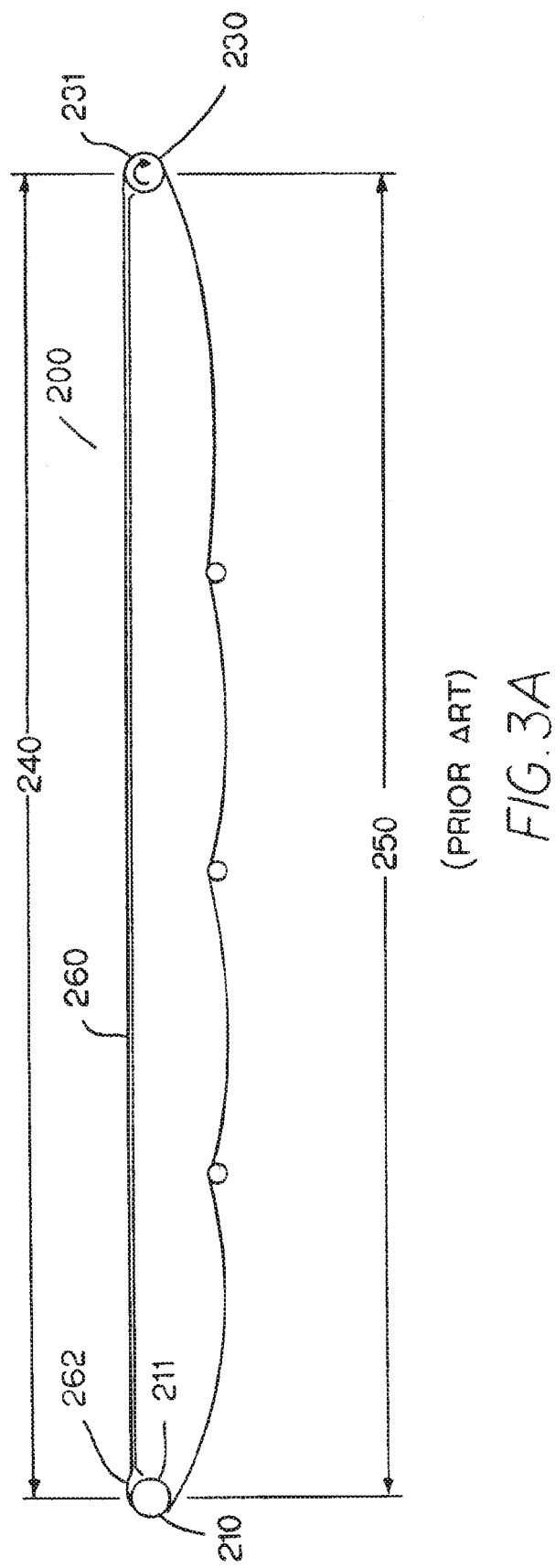
FIG. 3A is a simplified schematic cross-sectional representation of a prior art conveyor running a positively-driven, toothed, low-tension, conveyor belt in which the infeed section of the conveyor utilizes a cylindrical member that is smaller in diameter than the arc of the natural curvature of the belt.
Figure 3B:
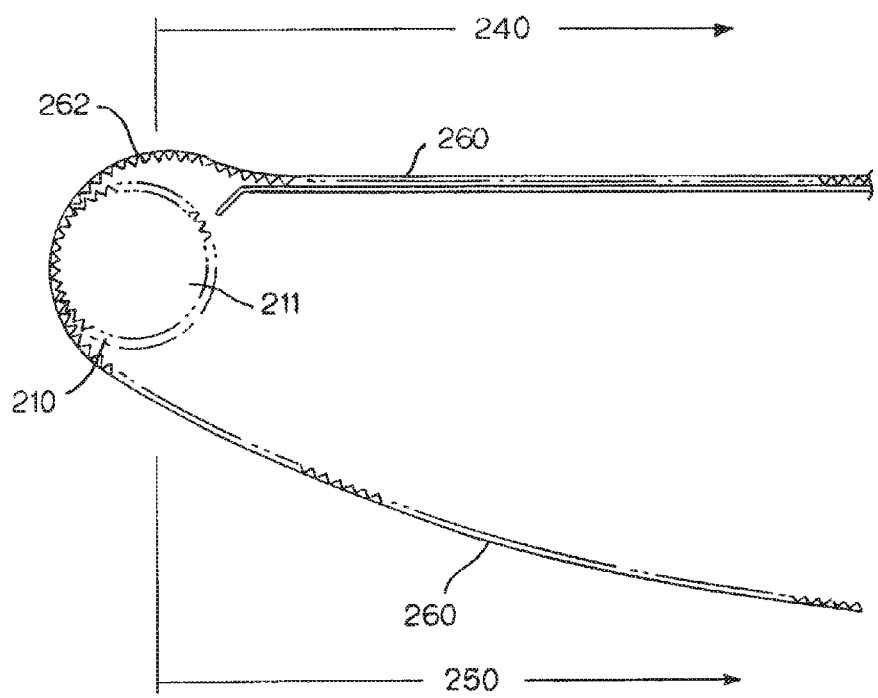
FIG. 3B is an enlarged view of the cross-sectional representation of the ridge along the width of the belt at the infeed shown in FIG. 3A.
Figure 4:
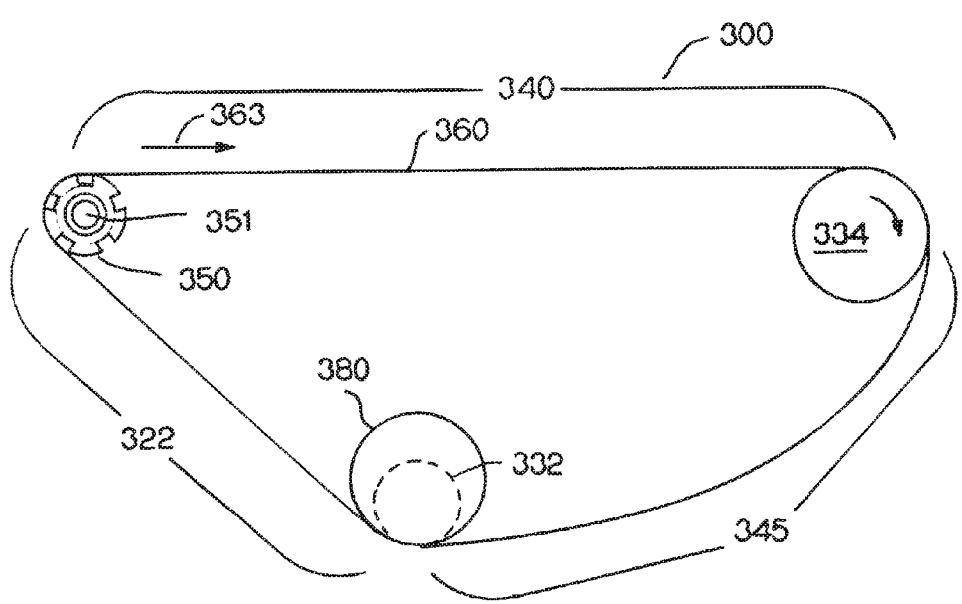
FIG. 4 is a side view of a positively-driven, low tension conveyor belt system having a tension amplifier according to an illustrative embodiment of the invention.
Figure 5:
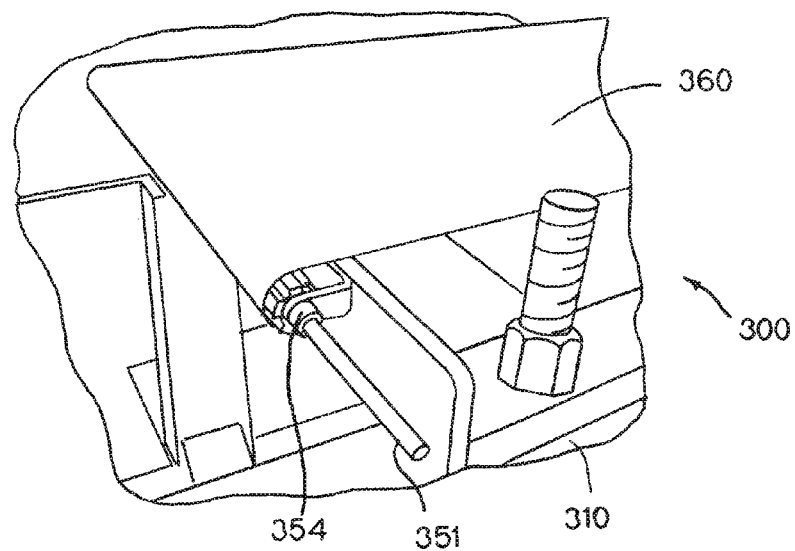
FIG. 5 is an isometric view of the positively-driven, low tension conveyor belt system of FIG. 4 at an infeed end.

FIGS. 4 and 5 illustrate a positively-driven, low tension conveyor belt system 300 having tight transfer geometry according to one embodiment of the invention. The conveyor belt system includes a tension amplifier for sufficiently amplifying tension in the returnway of the conveyor belt prior to the infeed to enable the belt to achieve a required transition around any geometry in the infeed, while simultaneously allowing the tension in the belt in the returnway zone prior to the point of amplified tension to remain at low tension. The conveyor belt system includes a base 310 and a positively-driven, low tension conveyor belt 360, such as the Thermo-Drive® belt available from Intralox, L.L.C., the Cleandrive positive drive belt available from Habasit AG, the Gates Mectrol PosiClean® positive drive belt available from Gates Mectrol, the Volta SuperDrive™ and other positive drive belts available from Volta Belting and other positively-driven, low tension conveyor belts known in the art. The invention is not limited to these belts, and may be implemented with any suitable positive-drive, low tension conveyor belt. The illustrative conveyor belt has a smooth outer surface substantially free of discontinuities and an inner surface with a plurality of teeth at a given belt pitch. The conveyor belt 360 conveys products along a carryway in the direction of arrow 363 and returns along a returnway below the carryway. The conveyor belt may be conventionally trained around belt-guiding members, illustrated as driven sprockets 332 in the returnway, drive sprockets 334 at the outfeed and a nosebar 350 at the infeed of the carryway.

The first set of driven sprockets 332 is located in the returnway of the conveyor belt, and the second set of drive sprockets 334 is mounted at an end of the carryway for driving the conveyor belt. A passive, toothed nosebar 350 is mounted at an end of the conveyor opposite the second set of sprockets. The nosebar 350 forms a guide structure for guiding the conveyor belt. In the illustrative embodiment, the nosebar is located at the infeed end of the conveyor and the drive sprockets 334 are located at the discharge end of the conveyor.

The nosebar 350 is mounted on and is freely rotatable about a shaft 351 connected to the base 310 at a first end. Roller bearings 354 facilitate rotation of the nosebar 350 about the shaft 351. The nosebar 350 has a relatively small diameter, smaller than the arc of the natural curvature of the belt 360. The small radius of the nosebar allows a smaller gap between two conveyor belts or between the conveyor belt and another device.

Figure 7A:
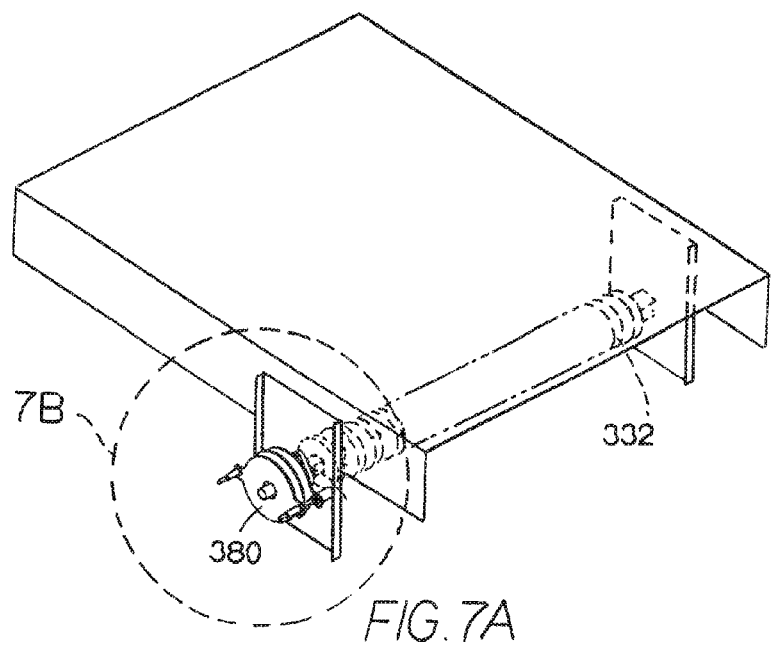
FIG. 7A illustrates a disc brake coupled to a set of sprockets in the returnway of the conveyor of FIGS. 4 and 5.
Figure 7B:
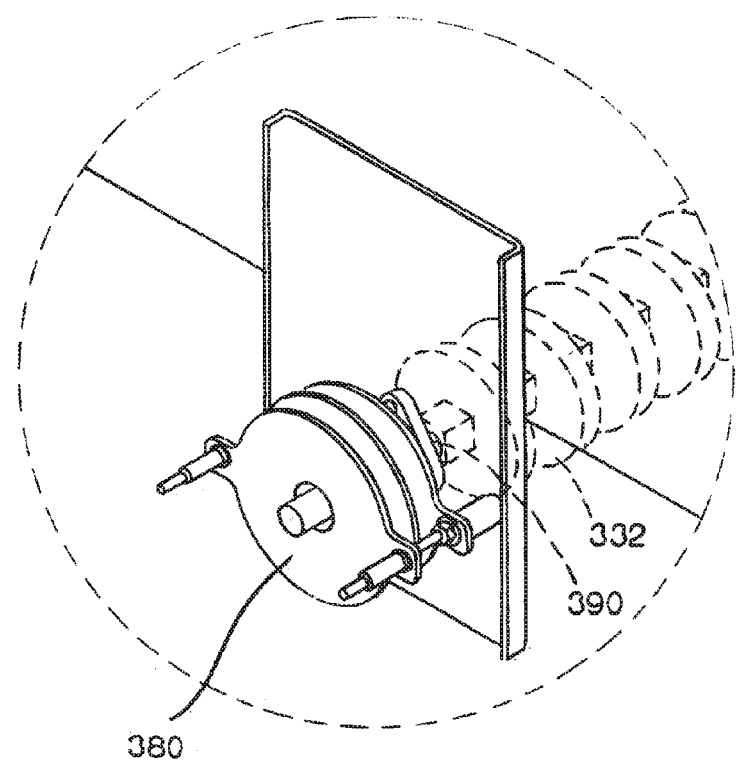
FIG. 7B is a close-up view of the disc brake of FIG. 7A.
Figure 7C:
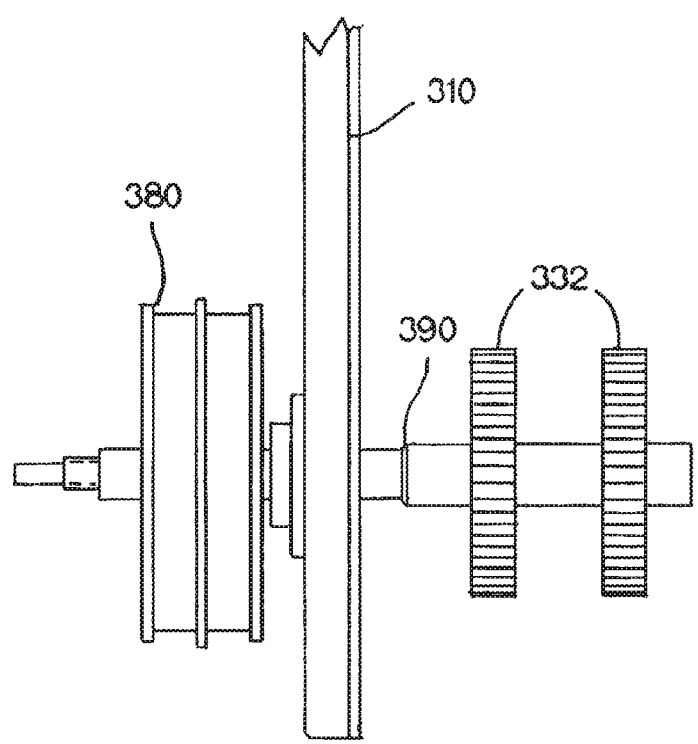
FIG. 7C is a front view of the disc brake and sprockets of FIG. 7A.

A tension amplifier, illustrated as a braking device 380 coupled to the driven sprockets 332 in the returnway, applies tension to the belt prior to infeed to allow the conveyor belt to wrap around the relatively small-diameter nosebar 350. A tension amplifier, such as a braking device 380, allows the belt 360 to conform to the nosebar 350 in the transfer region by applying select tension to only a portion of the conveyor belt 360, as described below. The braking device 380 of the illustrative embodiment is described below with respect to FIGS. 7A-7C.

Referring to FIGS. 6A-6C, the nosebar extends from a first end 353 to a second end 354 and includes a plurality of teeth about its perimeter. The nosebar includes an axial opening 352 for receiving the shaft 351 (shown in FIG. 4) about which the nosebar 350 rotates. The illustrative nosebar 350 includes five teeth 355a-355e, though the invention is not limited to five teeth. Recesses 356 between the teeth receive drive elements on the drive surface of the conveyor belt 360. The illustrative teeth 355 are larger than the recesses 356 and have curved edges.

In one embodiment, multiple nosebars may be mounted in series on a shaft with braces therebetween.

Referring back to FIGS. 4 and 5, the conveyor system 300 further includes a tension amplifier, illustrated as a braking device 380, for dynamically applying tension to select portions of the conveyor belt. The illustrative braking device 380 is a disc brake, shown in detail in FIGS. 7A-7C. The braking device may alternatively comprise a friction brake, hydraulic motor, electric motor, magnetic particle brake, weight, rollers or other suitable device. The braking device 380 allows the belt to conform to the small-diameter nosebar 350 or other belt-guiding member. The braking device 380 dynamically increases tension in the belt to create a returnway amplified tension zone 322 in the conveyor belt circuit, extending between the infeed end of the carryway 340 and the braking device 380, to ensure that the belt wraps around the nosebar 350. This increased tension remains in the conveyor belt 360 through the carryway tension zone 340. The illustrative braking device 380 adds belt tension through these zones to any tension that already exists in the belt. As the belt transitions from the drive pulley 334 into the returnway tension zone 345 the conveyor belt is relieved of this dynamically inserted tension and is able to relax.

The braking device 380 is connected to a shaft 390 upon which the series of driven sprockets 332 are mounted. The illustrative braking device comprises a disc brake. The disc brake dynamically applies tension to the returnway amplified tension zone 322 between the nosebar 350 and the driven sprockets and through the carryway 340 by slowing the shaft 390 to apply drag to the belt only in those regions, while the returnway tension zone 345 remains under little to no tension.

The illustrative tension amplifier 380 dynamically increases tension in the select portion of the belt circuit only when the drive sprockets are driving the belt, causing the belt to move through the circuit. When the conveyor belt is stationary, the tension amplifier imparts no additional tension. When the conveyor belt is stationary, only static tension, which is always present in the belt regardless of movement, such as pretension, is present in the belt and the tension amplifier 380 does not increase belt tension.

Figure 8A:
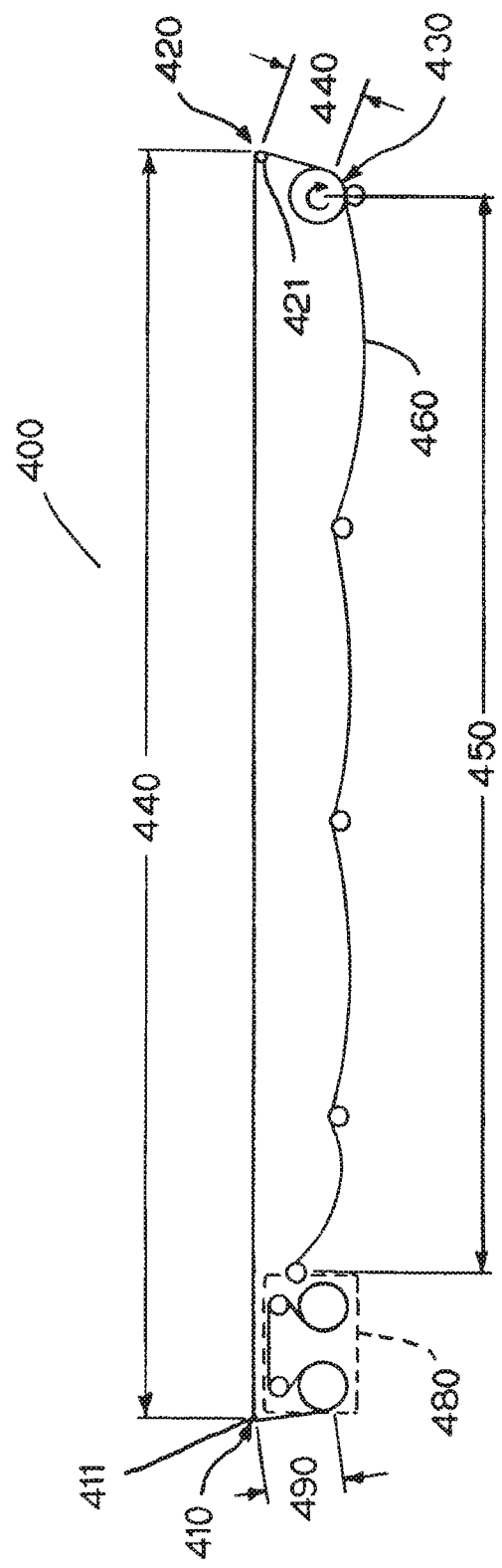
FIG. 8A is a schematic cross-sectional view of a positively-driven, low tension conveyor belt system having tension amplifier according to another embodiment of the invention.

FIG. 8A illustrates a conveyor 400 having a positively driven, low tension conveyor belt 460 and including a tension amplifier 480 according to another embodiment of the invention. The conveyor 400 runs a positively-driven, toothed, low-tension, conveyor belt 460 through a circuit. The conveyor includes a small belt-guiding member 411, such as a sprocket, roller, nosebar, or static shoe at the infeed 410, a small belt-guiding member 421, such as a sprocket, roller, nosebar or static shoe at the outfeed 420, a drive sprocket 430 below the carryway 440, and a tension amplifier 480 located in the returnway 450. The tension amplifier creates a returnway amplified tension zone 490 between the carryway tension zone 440 and the returnway tension zone 450 when the conveyor belt is running.

Figure 8B:
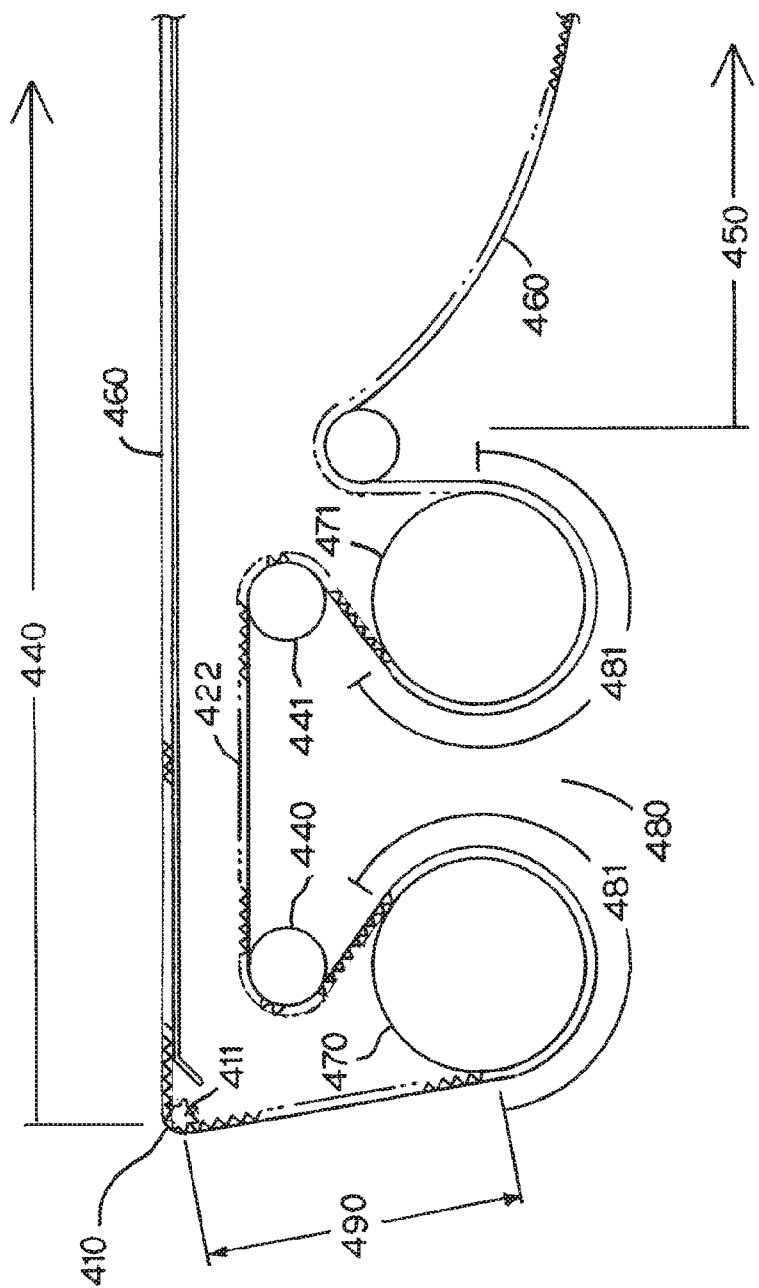
FIG. 8B is an enlarged view of the tension amplifier of FIG. 8A.

FIG. 8B is an enlarged view of the tension amplifier 480 in FIG. 8A. The cylindrical member 411 at the infeed 410 is very small in diameter and the conveyor belt 460 cannot naturally conform to the periphery of the sprocket at the infeed 410 with the low tension desired in the conveyor belt 460 in the returnway tension zone 450. In the present invention, the tension amplifier 480 functions to multiply any tension already present in the conveyor belt 460 before the tension amplifier 480. The tension amplifier creates a returnway amplified tension zone 490, which is between the returnway tension zone 450, where the tension is required to be low, and the infeed 410, where the tension is required to be sufficiently high to conform to the periphery of the small belt-guiding member 411 in the infeed 410. The tension amplifier 480 dynamically increases tension in the belt in the returnway amplified tension zone 490 of the conveyor belt circuit, extending between the infeed end of the carryway 410 and the tension amplifier, to ensure that the belt wraps around the small belt-guiding member 411. This increased tension remains in the conveyor belt 460 through the carryway tension zone 440. As the belt transitions from the drive pulley 430 into the returnway tension zone 450, the conveyor belt is relieved of this dynamically increased tension and is able to relax.

Preferably, the tension amplifier dynamically inserts tension into the selected portion of the belt circuit when the conveyor belt is operating, adding no additional tension (static tension) to the conveyor belt when the conveyor belt is stationary. Thus, when the conveyor belt is stationary, only static tension is present.

In one embodiment, the tension amplifier comprises one or more belt-wrapping members, illustrated as rollers 470, 471, affixed perpendicular to the conveyor belt 460 within the circuit of the belt, preferably in the returnway. The rollers 470, 471 are parallel to each other and separated by a selected distance. The drive surface 422 of the conveyor belt 460 rides along outer peripheries of the rollers 470, 471. Because the rollers 470, 471 are substantially resistant to the rotational movement of the conveyor belt 460, drag is created in the conveyor belt 460. The drag created corresponds to the amount of arc of wrap 480, 481 of the conveyor belt 460 around the rollers 470, 471.

The belt-wrapping members 470, 471 may have any suitable size, shape and form suitable for inducing drag in a conveyor belt that wraps around the belt-wrapping member. In the illustrative embodiment, the belt-wrapping members are cylindrical rollers, but the belt-wrapping members may alternatively have an elliptical shape, a semi-circular shape, a polygonal shape or any suitable geometric shape.

In one embodiment, optional wrap control rollers 440, 441 can be positioned horizontally and vertically relative to the rollers 470, 471 to alter the amount of wrap 480, 481 the conveyor belt 460 has around the rollers 470, 471, thereby controlling the amount of drag created in the amplified tension zone 490.

In another embodiment, not shown in FIG. 8B, the substantially cylindrical rollers 470, 471 may be substantially fixed by use of an external brake. The external brake may function as a safety clutch that enables the substantially fixed rollers 470, 471 to selectively rotate when the tension required to conform the belt to the geometry at the infeed 410 is exceeded. The clutch releases the rollers 470, 471 if the multiplied tension is too high, given the levels of incoming tension.

In yet another embodiment, not shown in FIG. 8B, the substantially belt wrapping members 470, 471 may include recesses or other geometry for engaging the teeth of the conveyor belt 460.

In one embodiment, the wrap control rollers 440, 441 rotate along with the conveyor belt 460.

In another embodiment, the wrap control rollers 440, 441 are fixed and resist the rotational movement of the conveyor belt 460 thereby creating drag with the surface of the conveyor belt 460 regardless of the profile of the belt surface.

A sensor or other device may monitor the tension amplifier 480 and-or the tension in the conveyor belt 460 between the amplifier 480 and the infeed 410. The sensor may be connected to a controller for controlling the positions of the rollers 470, 471 to alter the effective arc of wrap in order to achieve the desired tension in the positively-driven conveyor belt in the amplified tension zone 490 between the tension amplifier 480 and the infeed 410.

Figure 9A:
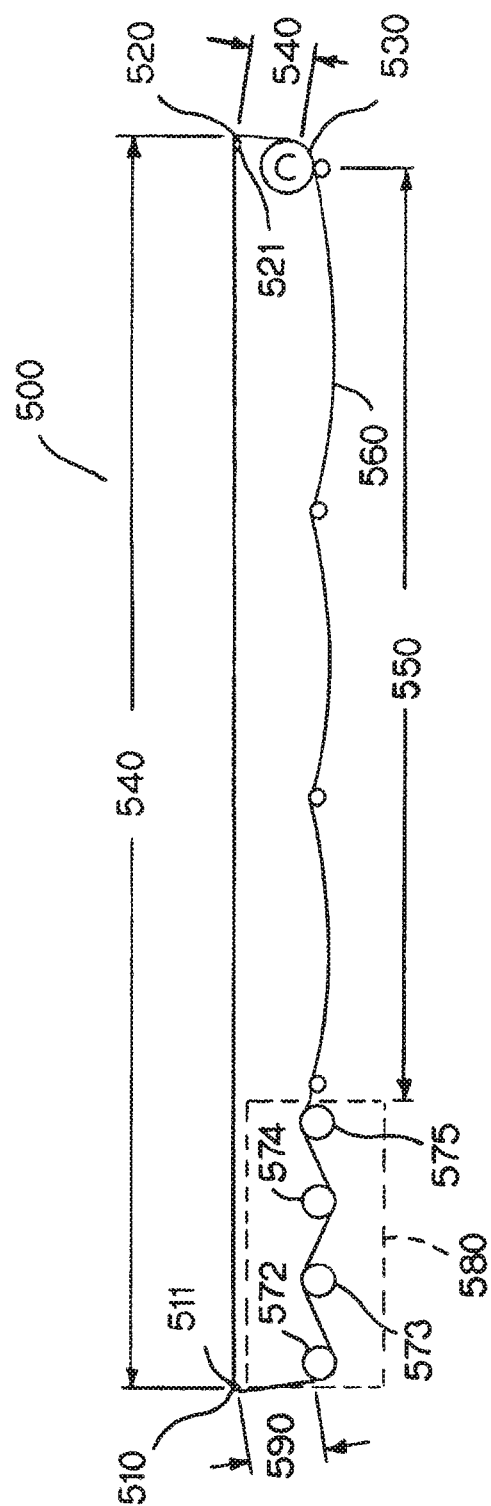
FIG. 9A is a schematic cross-sectional view of a positively-driven, low tension conveyor belt system having tension amplifier according to another embodiment of the invention

FIG. 9A is a simplified schematic cross-sectional representation of a conveyor 500 running a positively-driven, toothed, low-tension, conveyor belt 560, with a belt-guiding member 511, such as a sprocket, roller, nosebar or static shoe, at the infeed 510 and a tension amplifier 580 disposed in the returnway 550 of the belt. The conveyor also includes a small belt-guiding member 521, such as a sprocket, roller, nosebar or static shoe, at the outfeed 520 and a drive sprocket 530 below the carryway 540. The tension amplifier 580 creates a returnway amplified tension zone 590 when the conveyor belt is running by multiplying tension already in the belt prior to the tension amplifier. The returnway amplified tension zone 590 created by the tension amplifier extends between the carryway tension zone 540 and the returnway tension zone 550. The tension amplifier 580 comprises a serpentine arrangement of substantially fixed, belt-wrapping members, illustrated as rollers 572, 573, 574, 575, inserted into the belt circuit, preferably in the returnway. The conveyor belt 560 serpentines through the rollers 572, 57, 574, 575 to provide resistance and increase tension in the zone 590 by multiplying the tension already in the belt as it enters the tension amplifier 580. This increased tension remains in the conveyor belt 560 through the carryway tension zone 540. As the belt transitions from the drive pulley 530 into the returnway tension zone 550, the conveyor belt is relieved of this dynamically increased tension and is able to relax.

FIG. 9B is an enlarged view of the tension amplifier 580 of FIG. 9A. In one embodiment, the arc of the wrap 582, 583, 584, 585 of the belt around the rollers is determined by the proximity of the two or more belt-wrapping members 572, 573, 574, 575 relative to each other.

In one embodiment, the belt-wrapping members 572, 573, 574, 575 can be adjusted relative to each other based upon a measurement of the tension being generated by the tension amplifier 580. A sensor or other device may measure the tension and send signals to a controller that controls the separation distance or position of the substantially cylindrical objects 572, 573, 574, 575 in order to control the amount of tension in the conveyor belt through the amplified tension zone 590.

While the illustrative belt-wrapping members comprise substantially cylindrical rollers, the belt wrapping members in the tension amplifier 580 may have any suitable geometry for multiplying tension in a conveyor belt.

Figure 10:
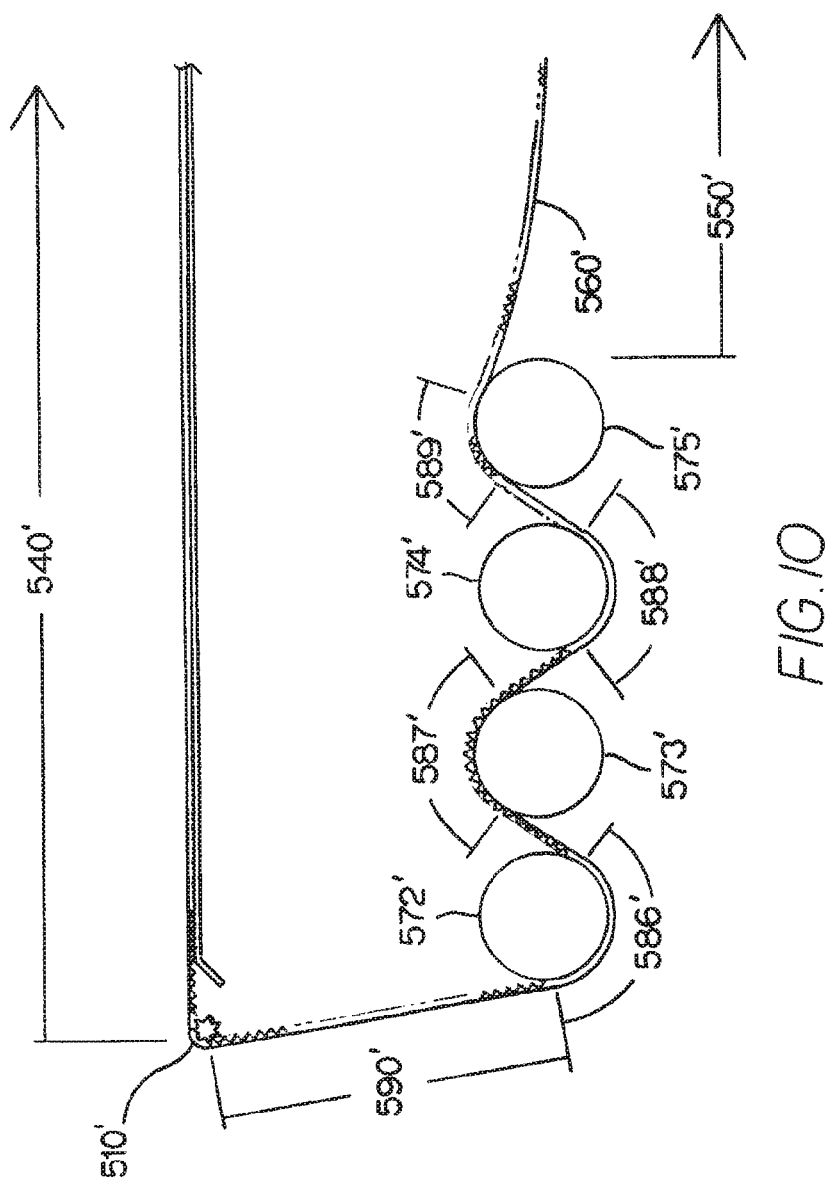
FIG. 10 shows another embodiment of a tension amplifier suitable for use in a conveying system including a positively-driven, low tension conveyor belt.

FIG. 10 is a simplified schematic cross-sectional representation of another embodiment of the dynamic tension amplifier of FIG. 9B, in which the belt-wrapping members, illustrated as substantially cylindrical objects 572', 573', 574', 575', for wrapping a positively-driven, low tension conveyor belt 560' are in closer horizontal proximity than in FIG. 9B, resulting in a greater arc of wrap 586', 587', 588', 589'.

Figure 11:
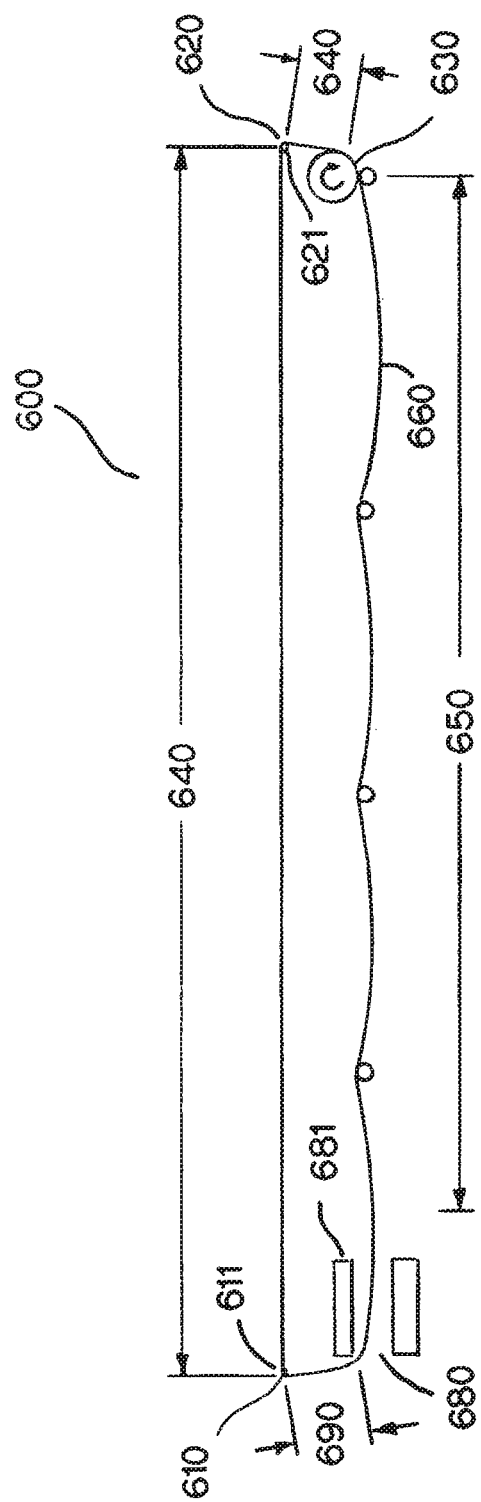
FIG. 11 shows another embodiment of a tension amplifier suitable for use in a conveying system including a positively-driven, low tension conveyor belt.

FIG. 11 illustrates another embodiment of a positively-driven, low tension conveyor belt conveying system 600 including a tension amplifier according to another embodiment of the invention. The tension amplifier 680 of FIG. 11 comprises a plate or rail system. The plate or rail system comprises an upper member 681, comprising a plate or rail, disposed adjacent to the drive surface of the conveyor belt 660 in the returnway and a lower member 682, comprising one or more rails adjacent to the conveying surface of the conveying belt in the returnway. The conveyor belt runs between the members 681, 682 under adjustable levels of pressure, thereby inducing drag on the conveyor belt to selectively add dynamic tension to the belt. In one embodiment, the rails may be v-shaped or otherwise shaped in the direction of the drive and thereby also serve as a scraper to clean the belt. The dynamic tension creates a tension amplified zone 690 prior to the infeed 611. The increased tension remains in the belt through the carryway tension zone 640 to the drive pulley 630. As the belt transitions from the drive pulley 630 into the returnway tension zone 650, the conveyor belt 660 is relieved of this dynamically increased tension and is able to relax.

FIG. 12A-12D illustrates a tension amplifier 780 for a positively driven, low tension conveyor belt 760 according to another embodiment of the invention. The conveyor 700 runs a positively-driven, toothed, low-tension, conveyor belt 760 through a circuit. The conveyor includes a small belt-guiding member 711, such as a sprocket, roller, nosebar, or static shoe at the infeed 710, and a tension amplifier 780 located in the returnway 750. A drive sprocket (not shown) is located at another location in the circuit. The tension amplifier creates a returnway amplified tension zone 790 between the carryway tension zone 740 and the returnway tension zone 750 when the conveyor belt is running to help the belt 760 conform to the infeed belt-guiding member 711.

The tension amplifier includes a frame 781 for mounting the various components of the tension amplifier to the conveyor. The frame 781 comprises two opposing plates 782 connected by support beams 784. The support beams 784 extend along the length and width of the frame. The tension amplifier includes a plurality of belt-wrapping members, shown as rollers 770 and 771, are mounted to the frame 781 within the returnway of the belt. The drive surface of the conveyor belt 760 rides along outer peripheries of the rollers 770, 771. The side plates 782 include openings 783 for mounting the rollers 770, 771.

In the illustrative embodiment, each roller 770, 771 comprises a cylindrical member 772 having triangular mounting tabs 775 extending longitudinally along the top of the cylindrical member. The cylindrical member 772 is inserted in a sleeve 773 having a longitudinally extending protrusion 776 including a triangular opening for receiving the triangular mounting tabs 775. The openings 783 in the side plates 782 include square recesses for receiving the protrusions on the sleeve, preventing rotation of the rollers when mounted.

The belt-wrapping members 770, 771 may have any suitable size, shape and form suitable for inducing drag in a conveyor belt that wraps around the belt-wrapping member. In the illustrative embodiment, the belt-wrapping members are cylindrical rollers with protrusions, but the belt-wrapping members may alternatively have an elliptical shape, a semi-circular shape, a polygonal shape or any suitable geometric shape.

In one embodiment, optional wrap control rollers 740, 741, 742, 743 can be positioned relative to the rollers 770, 771 to control the amount of wrap the conveyor belt 760 has around the rollers 770, 771, thereby controlling the amount of drag created in the amplified tension zone 790. The position of the inside wrap control rollers 741, 742 may be variable to allow for adjustment to the amount of wrap.

Figure 12A:
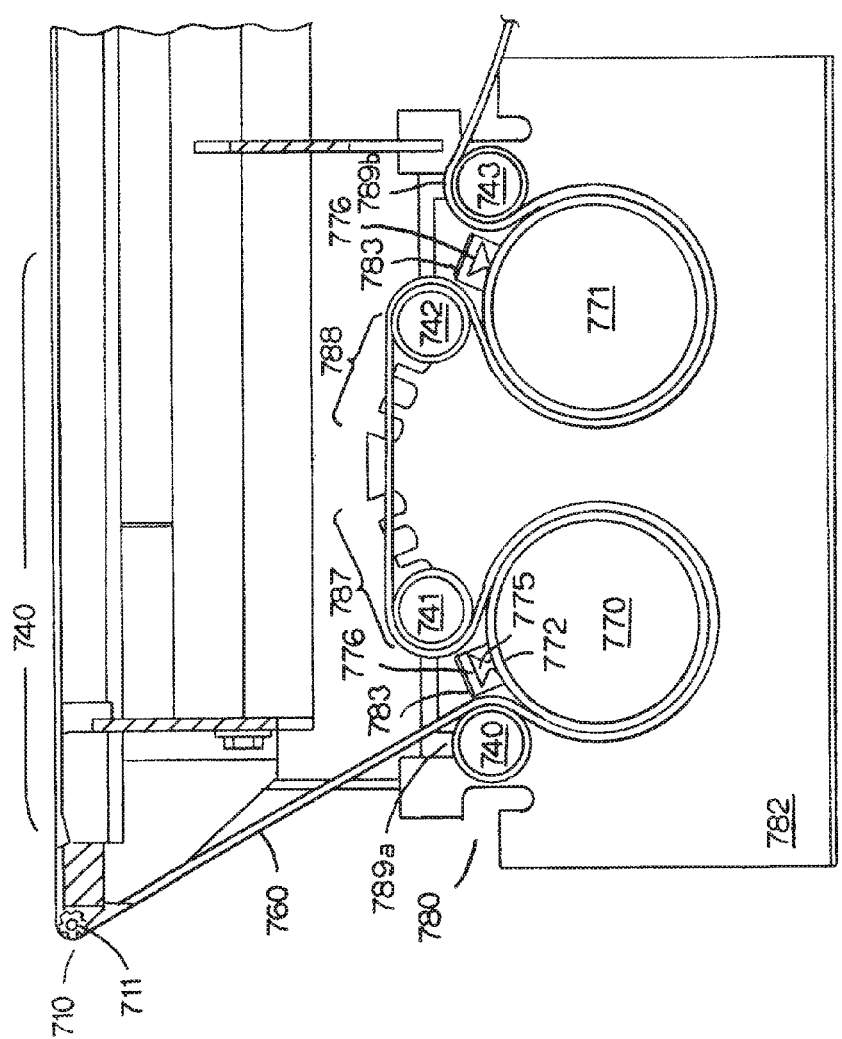
FIG. 12A is a side view of an infeed portion of a conveyor system including a tension amplifier according to another embodiment of the invention.
Figure 12C:
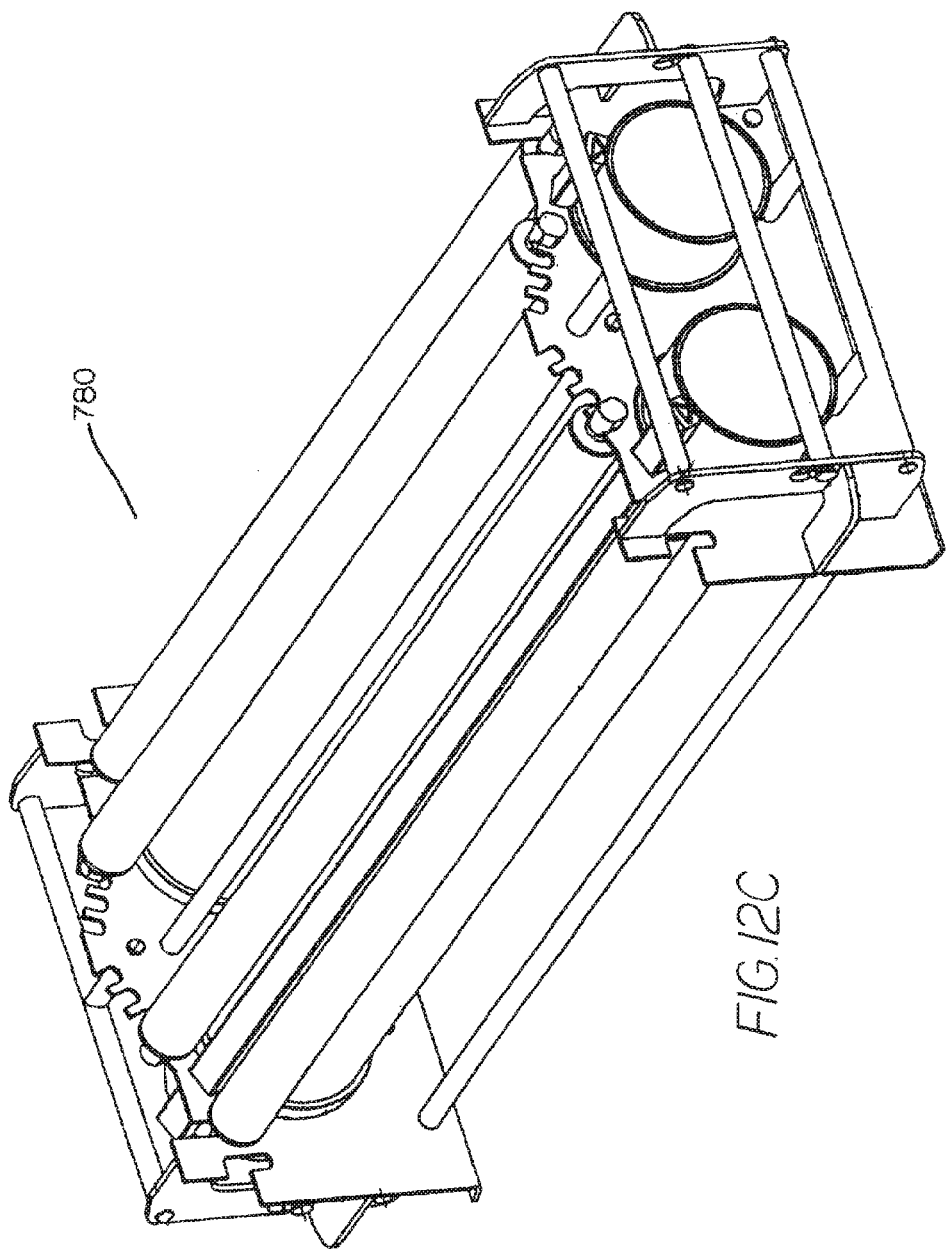
FIG. 12C is an isometric view of the tension amplifier of FIG. 12B.
Figure 12D:
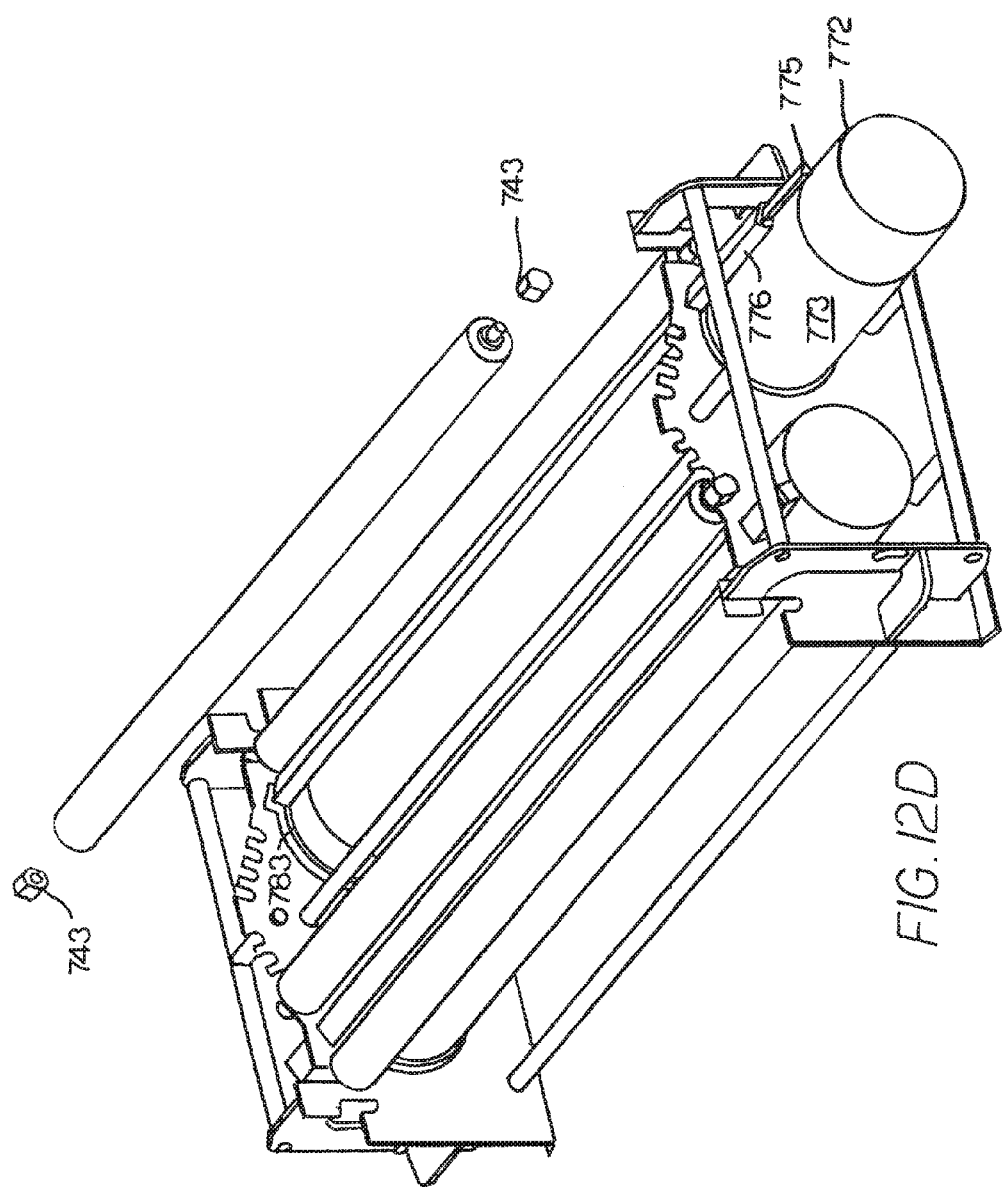
FIG. 12D is an exploded view of the tension amplifier of FIG. 12C.

As shown, the top of each side plate 782 includes two sets of slots 787, 788 extending at angles. An inside wrap control roller 741, 742 is inserted into a slot from each set. The position of each inside wrap roller is adjustable. As shown in FIG. 12D, each wrap control roller 741, 742 includes an end cap 743 with flat sides configured to be received in a slot. The configuration of the end cap 743 and slots prevent rotation of the wrap control rollers when inserted.

The side plates 782 also include outer slots 789a, 789b for mounting the outer wrap rollers 740, 743.

Figure 13:
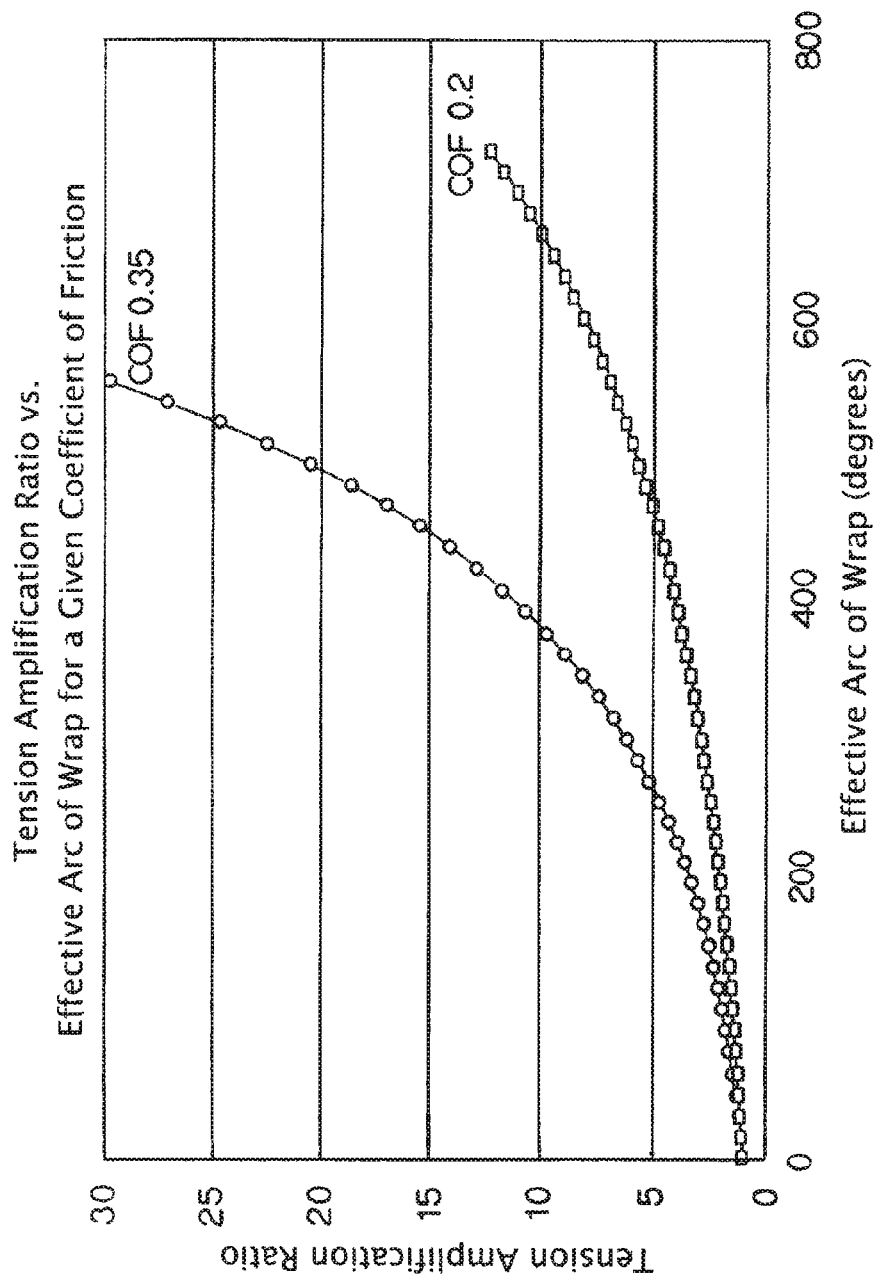
FIG. 13 is a chart showing the exponential growth of amplification due to the increased arc of wrap of the conveyor belt under various coefficients of friction
Figure 14:
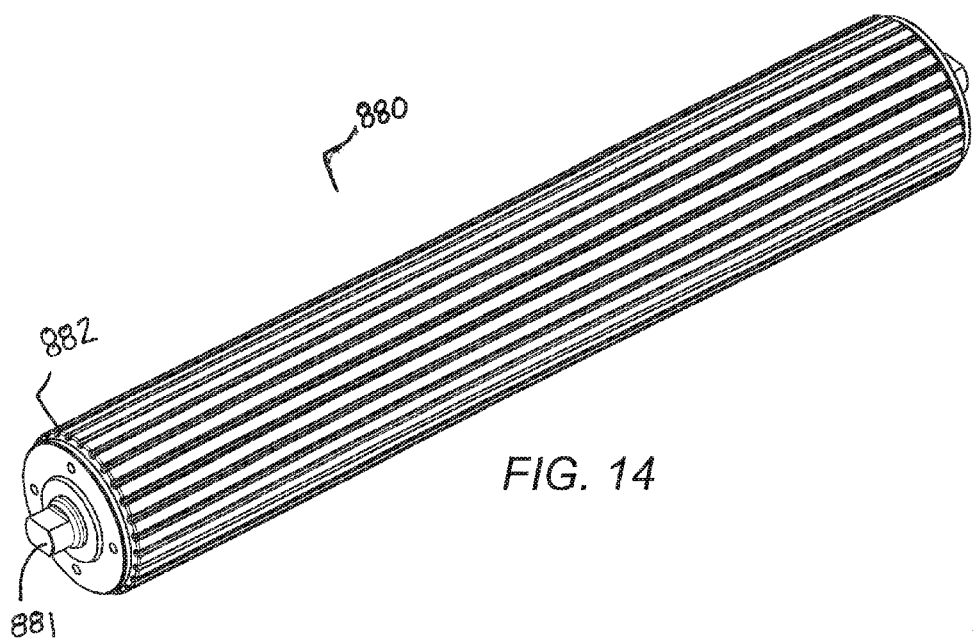
FIG. 14 is an isometric view of a roller assembly that forms a tension amplifier according to another embodiment of the invention.
Figure 17:
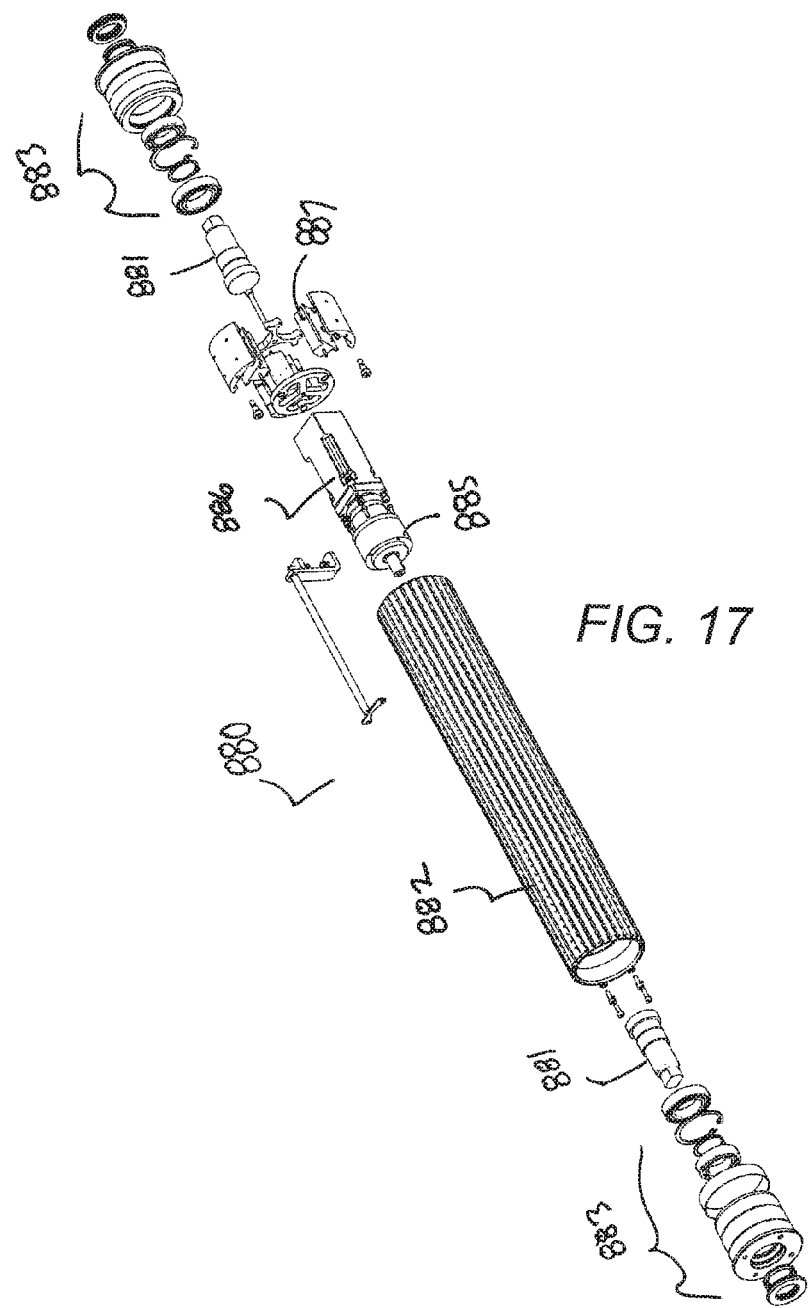
FIG. 17 is an exploded view of the roller assembly of FIG. 14.

FIG. 13 is a chart showing the exponential growth of amplification due to the increased arc of wrap of the conveyor belt under various coefficients of friction. As shown, the tension amplification ratio generally increases with the effective arc of wrap of the conveyor belt around a cylindrical member.

FIGS. 14-17 show another embodiment of a tension amplifier 880 suitable for tensioning a portion of a circuit of a positively-driven, low tension conveyor belt. The tension amplifier 880 comprises a roller assembly having a static shaft 881 mounted in the conveyor returnway and a roller, shown as drum 882 with teeth or other features for engaging the conveyor belt and creating drag. The drum 882 rotates about the static shaft 881. Bearings 883 control the position of the drum 882 relative to the shaft 881. As the conveyor belt engages and turns the drum 882, localized tension is created, which, combined with the speed of the conveyor belt, generates power. A planetary gearbox 885 is connected to the drum 882 and increases the relatively low drum speed so that the output of the planetary gearbox 885 is a relatively high-speed shaft. The high-speed shaft, which rotates at a rate that is equal to the drum revolutions per minute times the ratio of the gearbox, is connected to a permanent magnet electric motor 886, which operates as a generator and creates a voltage when the drum 882 rotates. The voltage generated by the motor depends on the speed at which the motor is driven. The tension amplifier 880 further includes resistors 887 between the coils of the motor to convert the motor power to heat, which is then dissipated through the drum 882 into the conveyor belt. In this manner, the tension amplifier 880 can insert dynamic tension in a localized area between the tension amplifier and an infeed, without increasing tension between the tension amplifier and the drive for the conveyor belt.

Figure 18:
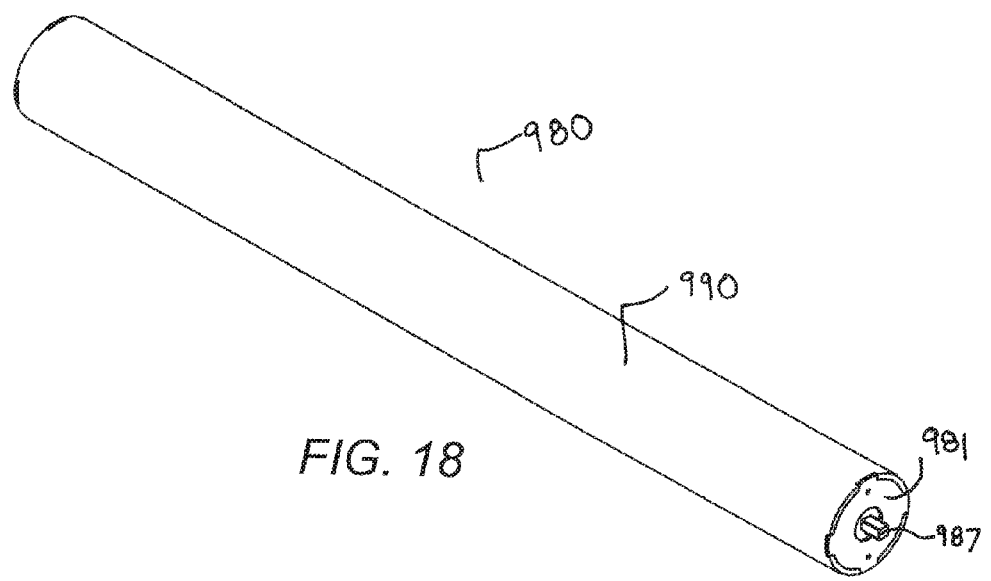
FIG. 18 is an isometric view of a dashpot that forms a tension amplifier according to another embodiment of the invention.
Figure 19:
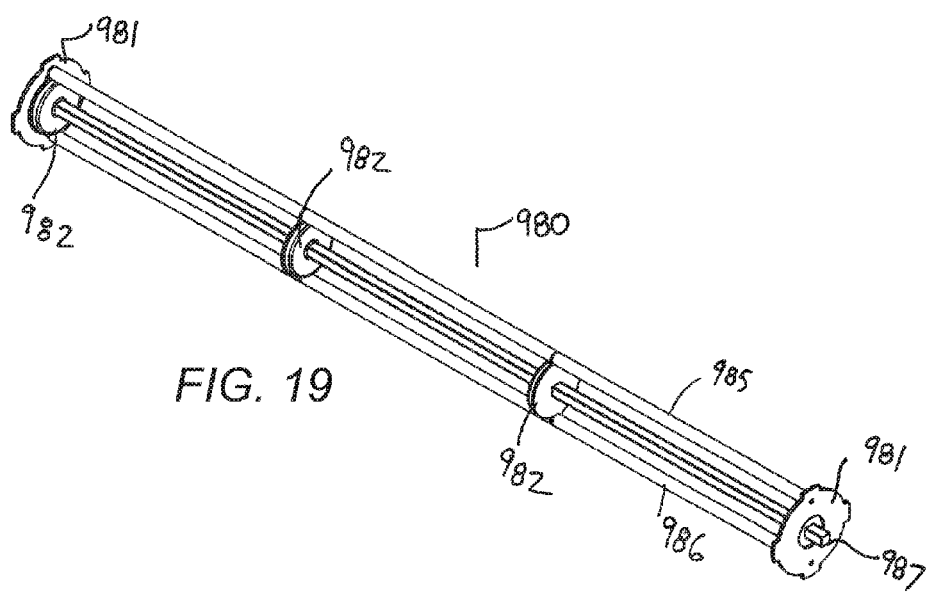
FIG. 19 shows the dashpot of FIG. 18 with the outer shell removed.
Figure 20:
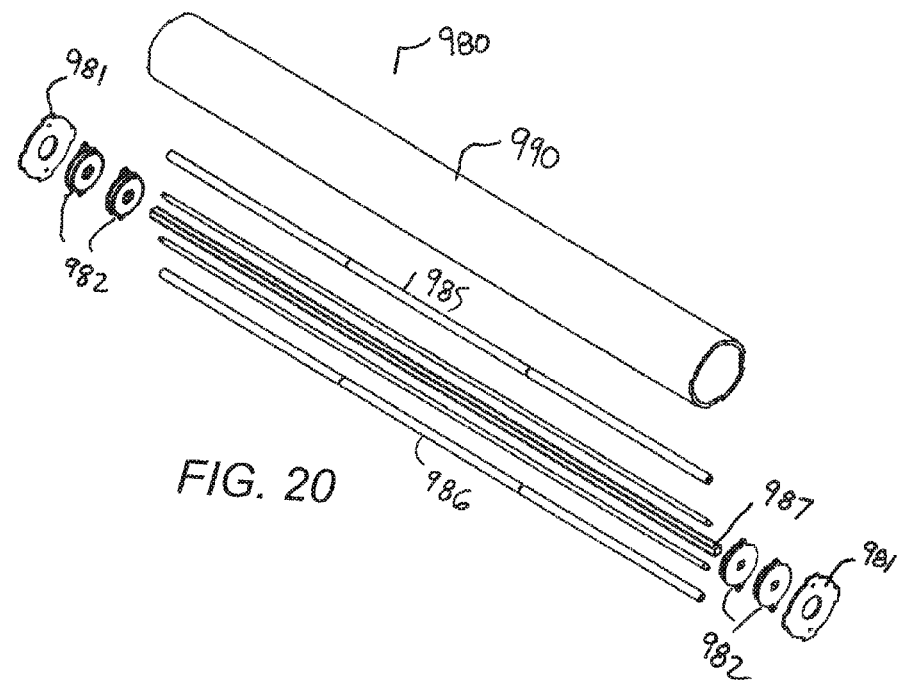
FIG. 20 is an exploded view of the dashpot of FIG. 18.

In another embodiment, a dashpot, an embodiment of which is shown in FIGS. 18-20, can serve as a tension amplifier in a returnway of a positive drive, low tension conveyor belt. The illustrative dashpot 980 uses viscous resistive material between two end plates 981 to produce a braking effect, thereby applying dynamic tension to a portion of the conveyor belt circuit. In one embodiment, the dashpot can comprise equally-spaced spring dampers 982, with spacers in between, slid onto two opposed round shafts 985, 986 and a square axle 987 in the middle. The components are inserted into a shell 990, which may be grooved or otherwise configured to engage a conveyor belt, and sandwiched between the end plates 981. The assembly (shell, spacers, dampers and shafts) rotates around the square axles to provide resistance against the conveyor belt.

The use of a tension amplifier in the returnway of a positively-driven, low tension conveyor belt allows the conveyor belt to conform to a member at an end of the conveyor belt that is smaller than the natural arc of curvature of the conveyor belt by increasing tension in only a portion of the conveyor belt circuit. The ability to only increase tension in the selected zone while the conveyor belt is running, without increasing tension when the conveyor belt is stationary, reduces wear, increases the life of the conveyor belt and improves tracking. Any suitable means for selectively and dynamically increasing tension in a limited portion of a conveyor belt circuit without increasing the near-zero tension of the conveyor belt in the returnway tension zone prior to the tension amplifier may be used.

The scope of the claims is not meant to be limited to the details of the described exemplary embodiments.

What is claimed is:

1. A conveyor system, comprising:
    a positively-driven, low tension conveyor belt trained around belt-guiding members to form a circuit having a carryway, an infeed, an outfeed and a returnway;
    a drive for positively driving the conveyor belt through the circuit; and
    a tension amplifier located in the returnway for increasing tension in a first section of the circuit between the tension amplifier and the carryway, while the returnway of the conveyor belt between the tension amplifier and the drive remains substantially untensioned.

2. The conveyor system of claim 1, wherein the drive is located in the returnway and spaced from the outfeed.

3. The conveyor system of claim 1, wherein the drive is located at the outfeed.

4. The conveyor system of claim 1, wherein the tension amplifier comprises a roller assembly including a generator within a roller for creating a load to resist the conveyor belt.

5. The conveyor system of claim 1, wherein the tension amplifier comprises a dashpot for resisting the conveyor belt.

6. A conveyor system, comprising:
    a positively-driven, low tension conveyor belt trained around an infeed belt-guiding member and an outfeed belt-guiding member to form a circuit having an infeed, a carryway, an outfeed and a returnway below the carryway;
    a drive for positively driving the conveyor belt; and a tension amplifier disposed in the returnway for dynamically increasing tension in a first section of the circuit, while a second section of the circuit remains substantially untensioned.

7. The conveyor system of claim 6, wherein the drive is located in the returnway and spaced from the outfeed.

8. The conveyor system of claim 6, wherein the drive is located at the outfeed.

9. The conveyor system of claim 6, wherein the tension amplifier comprises a roller assembly including a generator within a roller for creating a load to resist the conveyor belt.

10. The conveyor system of claim 6, wherein the tension amplifier comprises a dashpot for resisting the conveyor belt.

11. A method of conforming a positively-driven, low tension conveyor belt to an infeed member that is smaller than a natural arc of the conveyor belt, comprising the steps of:

running the conveyor belt through a circuit comprising a carryway having an infeed and an outfeed, and a returnway below the carryway using a drive that positively drives the conveyor belt; and increasing tension in the conveyor belt along a first section of the circuit using a tension amplifier in the returnway without increasing tension along the returnway of the circuit between the tension amplifier and the drive; and releasing the tension added by the tension amplifier at the drive, so that a second section of the circuit between the drive and the tension amplifier remains substantially untensioned.

12. The method of claim 11, wherein the drive is located in the returnway and spaced from the outfeed.

13. The method of claim 11, wherein the drive is located at the outfeed.

14. The method of claim 11, wherein the tension amplifier comprises a roller assembly including a generator within a roller for creating a load to resist the conveyor belt.

15. The method of claim 11, wherein the tension amplifier comprises a dashpot for resisting the conveyor belt.

* * * * *